US010681853B2

(12) United States Patent
McHale et al.

(10) Patent No.: US 10,681,853 B2
(45) Date of Patent: Jun. 16, 2020

(54) COUPLING APPARATUS FOR COUPLING AN AGRICULTURAL IMPLEMENT TO A PRIME MOVER

(71) Applicant: McHale Engineering, Ballinrobe, County Mayo (IE)

(72) Inventors: Padraic Christopher McHale, Clonbur (IE); Martin William McHale, Kilmaine (IE); Paul Gerard McHale, Tuam (IE); John Patrick Biggins, Hollymount (IE); James John Heaney, Claremorris (IE); Gerard Patrick Sheridan, Kilmaine (IE); Donal Patrick Collins, Dunmore (IE)

(73) Assignee: McHale Engineering, Ballinrobe (IE)

(*) Notice: Subject to any disclaimer, the term of this patent is extended or adjusted under 35 U.S.C. 154(b) by 37 days.

(21) Appl. No.: 15/574,983

(22) PCT Filed: May 17, 2016

(86) PCT No.: PCT/IE2016/000009
§ 371 (c)(1),
(2) Date: Nov. 17, 2017

(87) PCT Pub. No.: WO2016/185454
PCT Pub. Date: Nov. 24, 2016

(65) Prior Publication Data
US 2018/0139888 A1 May 24, 2018

(30) Foreign Application Priority Data
May 19, 2015 (IE) .................. S2015/0154

(51) Int. Cl.
*A01B 59/043* (2006.01)
*A01B 63/14* (2006.01)
*A01B 59/06* (2006.01)

(52) U.S. Cl.
CPC .......... *A01B 59/043* (2013.01); *A01B 59/066* (2013.01); *A01B 59/068* (2013.01); *A01B 63/14* (2013.01)

(58) Field of Classification Search
CPC ... A01B 59/043; A01B 59/068; A01B 59/066; A01B 63/14; A01B 61/046; A01B 63/28;
(Continued)

(56) References Cited

U.S. PATENT DOCUMENTS 3,593,504 A * 7/1971 Konig .................... A01D 34/63
56/13.7
3,747,311 A * 7/1973 DeCoene ............. A01D 41/141
56/208
(Continued)

FOREIGN PATENT DOCUMENTS

DE 2630493 A1 * 1/1978 .......... A01D 34/243
DE 196 24 396 A1 1/1998
(Continued)

OTHER PUBLICATIONS

International Search Report for PCT/IE2016/000009, dated Aug. 16, 2016.
(Continued)

*Primary Examiner* — Arpad Fabian-Kovacs
(74) *Attorney, Agent, or Firm* — Sughrue Mion, PLLC

(57) ABSTRACT

Coupling apparatus for coupling a mower to a front three-point linkage of a tractor includes a mounting element for coupling to the three-point linkage and a carrier element to which the mower is coupled. A linkage mechanism including upper link members and a lower link member couples the carrier element to the mounting element. The lower link member is pivotally coupled to the mounting element about a first lower pivot axis. A pair of take-up springs act between the lower link member and the mounting element to take up
(Continued)

Figure 1:
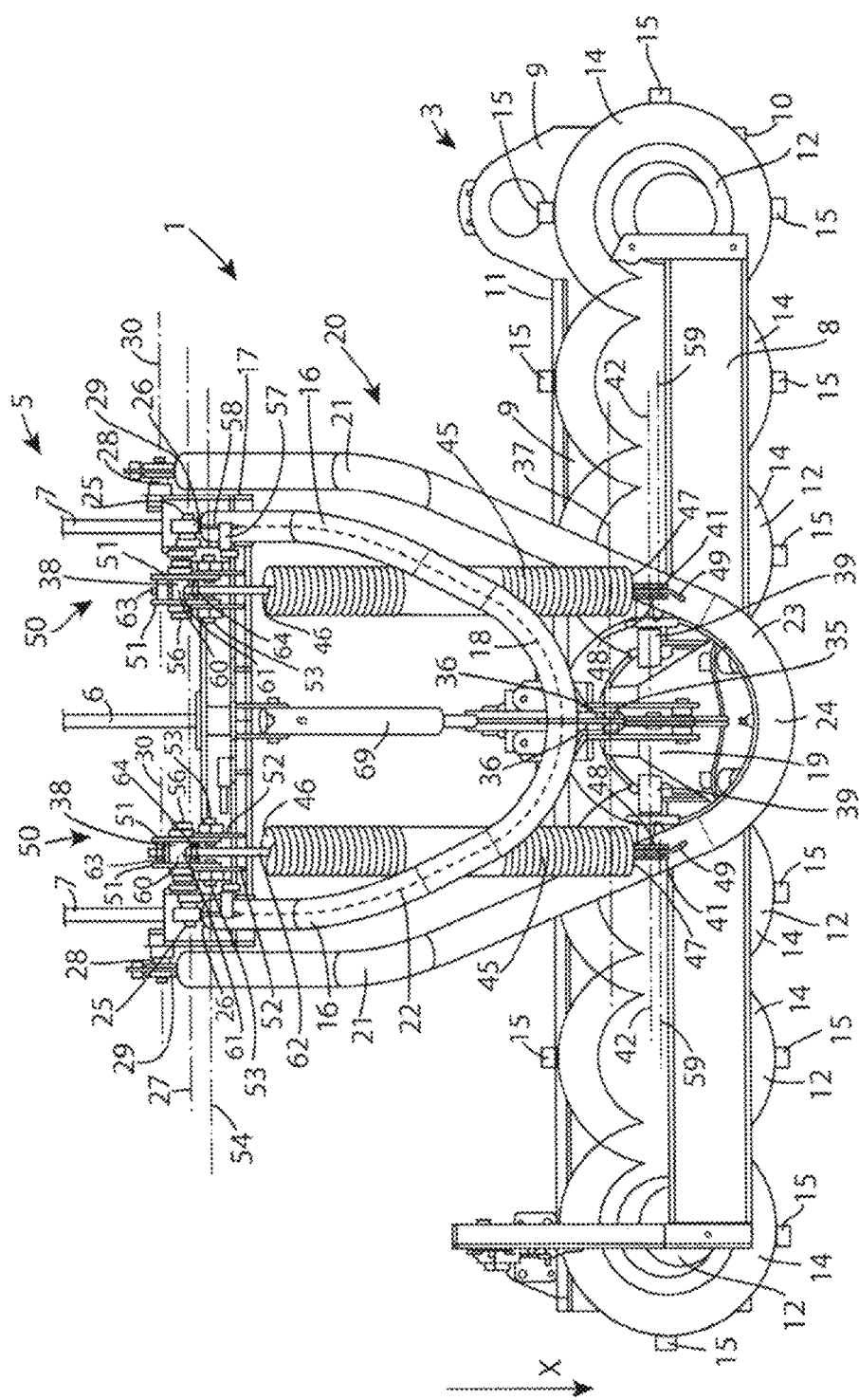

a portion of the weight of the mower. The take-up springs are coupled between corresponding anchor elements and corresponding anchor brackets on the lower link member. The anchor elements are carried on respective compensating arms, which in turn are pivotal on pivot shafts carried on the mounting element. Actuator arms acting between the lower link member and the compensating arms urge the anchor element upwardly and downwardly as the carrier element moves upwardly and downwardly for controlling the turning moment induced by the take-up springs in the linkage mechanism, in order to maintain the effective weight of the mower bearing on the ground substantially constant.

19 Claims, 24 Drawing Sheets

(58) Field of Classification Search
CPC ... A01B 59/0415; A01B 59/064; A01B 19/02; A01B 61/00; A01D 43/107; A01D 34/661; A01D 67/00; A01D 34/662; A01D 41/145; A01C 5/062; A01C 7/06; A01C 7/201; A01C 7/203
See application file for complete search history.

(56) References Cited

U.S. PATENT DOCUMENTS

| | | | | |
|---|---|---|---|---|
| 4,185,445 | A * | 1/1980 | van der Lely | A01D 43/107 56/13.6 |
| 4,206,584 | A * | 6/1980 | Johnson | A01D 41/14 56/15.8 |
| 4,218,865 | A * | 8/1980 | Chaumont | A01D 34/661 56/13.6 |
| 4,313,294 | A * | 2/1982 | Martenas | A01D 41/145 56/15.8 |
| 4,343,138 | A * | 8/1982 | Neuerburg | A01B 59/048 56/15.9 |
| 4,399,874 | A * | 8/1983 | Ryan | A01B 15/025 172/269 |
| 4,466,492 | A * | 8/1984 | Steinberg | A01B 35/28 172/551 |
| 4,609,051 | A * | 9/1986 | Good | A01B 61/046 172/266 |
| 4,723,396 | A * | 2/1988 | Ermacora | A01D 34/661 56/13.6 |
| 4,848,069 | A * | 7/1989 | Ermacora | A01D 34/38 56/15.8 |
| 4,932,475 | A * | 6/1990 | Homan | A01B 15/025 172/239 |
| 5,234,060 | A * | 8/1993 | Carter | A01C 7/205 172/260.5 |
| 5,351,635 | A * | 10/1994 | Hulicsko | A01B 61/046 111/135 |
| 5,353,579 | A * | 10/1994 | Wolff | A01B 61/04 56/15.2 |
| 5,353,580 | A * | 10/1994 | Wolff | A01D 34/661 56/15.2 |
| 5,868,207 | A * | 2/1999 | Langbakk | A01C 7/201 172/274 |
| 6,655,118 | B1 * | 12/2003 | Thompson | A01D 43/107 56/15.8 |
| 7,261,048 | B1 * | 8/2007 | Hantke | A01B 63/32 111/136 |
| 9,408,340 | B2 * | 8/2016 | Halter | A01B 63/10 |
| 2002/0059789 | A1 * | 5/2002 | Koorn | A01D 43/107 56/16.4 A |
| 2002/0144826 | A1 * | 10/2002 | Gerber | A01B 19/02 172/142 |
| 2008/0029002 | A1 * | 2/2008 | Sulman | A01B 63/32 111/89 |
| 2015/0107211 | A1 | 4/2015 | Halter et al. | |
| 2018/0139883 | A1 * | 5/2018 | Lung | A01B 19/10 |
| 2018/0325020 | A1 * | 11/2018 | Connell | A01B 63/28 |
| 2018/0325021 | A1 * | 11/2018 | Connell | A01C 7/201 |

FOREIGN PATENT DOCUMENTS

| | | |
|---|---|---|
| EP | 0 394 830 A1 | 10/1990 |
| EP | 1 321 022 A1 | 6/2003 |
| FR | 2 357 163 A1 | 2/1978 |
| FR | 2 992 143 A1 | 12/2013 |

OTHER PUBLICATIONS

Written Opinion of the International Searching Authority for PCT/IE2016/000009, dated Aug. 16, 2016.

* cited by examiner

COUPLING APPARATUS FOR COUPLING AN AGRICULTURAL IMPLEMENT TO A PRIME MOVER

The present invention relates to coupling apparatus for coupling an agricultural implement to a prime mover, for example, for coupling a mower or other such agricultural implement to a tractor.

Coupling apparatus for coupling agricultural implements to a tractor are well known, and coupling apparatus for coupling a mower to a tractor are likewise well known. When coupling a mower to a tractor, it is important that the mower will rise and fall with the contour of the field being mowed, and also, will rise over an obstruction, for example, a rock or other such obstruction in its path. Mowers are relatively heavy agricultural implements, and in general they comprise a skid plate which rides along the ground of the field being mowed. However, due to the weight of such mowers, it is essential that some of the weight of the mower acting downwardly on the ground be taken up, in order that the effective weight of the mower bearing on the ground is significantly less than its own actual weight, and typically the weight of the mower bearing on the ground should lie in the range of 200 kgs to 400 kgs, and preferably, is in the order of 300 kgs. Otherwise, when the mower hits an obstruction, its weight bearing downwardly will prevent the mower from riding over obstructions, and indeed rising over sudden increases in the gradient of a field.

Various solutions have been proposed to address this problem, one of which requires suspending the mower on one or more tension springs in conjunction with a linkage mechanism suspension system. However, a disadvantage of the use of one or more such tension springs is that as the mower drops downwardly relative to the tractor, the weight of the mower taken up by the tension springs increases, thus reducing the effective weight of the mower, which in turn reduces the effective weight with which the mower bears the ground to a level at which the mower becomes unstable, thus leading to erratic and inefficient mowing of the crop which is being mowed. Conversely, as the mower rises relative to the tractor, the weight of the mower taken up by the tension springs decreases, thus resulting in the effective weight of the mower bearing on the ground increasing to undesirable levels. This is undesirable, and there is therefore a need for a coupling apparatus for coupling a mower, and indeed, other agricultural implements to a tractor or other prime mover which addresses this problem.

The present invention is directed towards providing such coupling apparatus.

According to the invention there is provided coupling apparatus for coupling an agricultural implement to a prime mover, the coupling apparatus comprising a mounting element for coupling to the prime mover, a carrier element for carrying the agricultural implement, a linkage mechanism coupling the carrier element to the mounting element, the linkage mechanism being configured to permit movement of the carrier element in a generally upwardly and downwardly direction relative to the mounting element, a take-up element for taking up some of the weight of the agricultural implement, and a compensating means co-operating with the take-up element and being responsive to relative movement between the carrier element and the mounting element for maintaining the weight of the agricultural implement taken up by the take-up element substantially constant as the carrier element and the agricultural implement move upwardly and downwardly relative to the mounting element within the normal working range of upward and downward movement of the agricultural implement.

In one aspect of the invention the take-up element is connected between the mounting element and one of the linkage mechanism and the carrier element.

Preferably, the take-up element is connected to one of the mounting element and the one of the linkage mechanism and the carrier element through the compensating means.

Advantageously, the take-up element is connected to the mounting element through the compensating means.

Preferably, the take-up element is coupled to a first anchorage located on the compensating means.

In one aspect of the invention the compensating means is coupled to the mounting element and is configured for urging the first anchorage relative to the mounting element in response to the upward and downward movement of the carrier element.

Preferably, the compensating means is configured for urging the first anchorage in a generally downwardly direction relative to the mounting element in response to the downward movement of the carrier element relative to the mounting element.

Advantageously, the compensating means is configured for urging the first anchorage in a generally upwardly direction relative to the mounting element in response to the upward movement of the carrier element relative to the mounting element.

In another aspect of the invention the compensating means is configured to urge the first anchorage from a predefined upper state to a predefined lower state in response to the carrier element moving from a maximum upper position to the maximum lower position within the normal working range of the upward and downward movement of the carrier element relative to the mounting element.

Advantageously, the compensating means is configured so that the distance of travel of the first anchorage relative to the mounting element is substantially proportional to the distance of travel of the carrier element relative to the mounting element.

In another aspect of the invention the compensating means is pivotally coupled to the mounting element about a compensating pivot axis, and the first anchorage is carried on the compensating means at a location spaced apart from the compensating pivot axis.

Preferably, the compensating pivot axis extends generally transversely of the direction of normal forward motion of the coupling apparatus.

In another aspect of the invention the first anchorage is pivotally coupled to the compensating means about a pivot axis extending substantially parallel to the compensating pivot axis.

In another aspect of the invention an actuator element is coupled between the compensating means and the linkage mechanism for urging the compensating means relative to the mounting element in response to the upward and downward movement of the carrier element relative to the mounting element.

Preferably, the actuator element is coupled to the compensating means at a distance spaced apart from the compensating pivot axis.

In one aspect of the invention the actuator element is coupled to the compensating means adjacent the first anchorage.

Preferably, the actuator element is connected to the linkage mechanism spaced apart from the mounting element.

Advantageously, the actuator element is pivotally connected to the compensating means about a pivot axis extending substantially parallel to the compensating pivot axis.

In another aspect of the invention the actuator element is pivotally coupled to the linkage mechanism about a pivot axis extending substantially parallel to the compensating pivot axis.

In another aspect of the invention the actuator element comprises an actuator arm.

In another aspect of the invention the take-up element is coupled to a second anchorage located on the one of the linkage mechanism and the carrier element. Preferably, the second anchorage is located on the linkage mechanism.

In another aspect of the invention the take-up element comprises a resilient element coupled between the first and second anchorages.

In another aspect of the invention the linkage mechanism defines a fulcrum about which the carrier element is pivotal relative to the mounting element for permitting the upward and downward movement of the carrier element relative to the mounting element.

In one aspect of the invention the compensating means is configured to carry the first anchorage so that the perpendicular distance to the fulcrum from the line of action of the force in the take-up element acting through the first anchorage is variable in response to the upward and downward movement of the carrier element relative to the mounting element. Preferably, the compensating means is configured to vary the perpendicular distance to the fulcrum from the line of action of the force in the take-up element acting through the first anchorage to compensate for changes in the force in the take-up element acting through the first anchorage in response to the upward and downward movement of the carrier element relative to the mounting element.

Advantageously, the compensating means is configured to reduce the perpendicular distance to the fulcrum from the line of action of the force in the take-up element acting through the first anchorage in response to the downward movement of the carrier element relative to the mounting element.

Preferably, the compensating means is configured to increase the perpendicular distance to the fulcrum from the line of action of the force in the take-up element acting through the first anchorage in response to the upward movement of the carrier element relative to the mounting element.

In one aspect of the invention the line of action of the force of the take-up element acts through the first and second anchorages.

In another aspect of the invention the compensating means is configured to control the value of the turning moment induced by the take-up element about the fulcrum in response to the upward and downward movement of the carrier element relative to the mounting element within the normal working range of the upward and downward movement of the carrier element relative to the mounting element for maintaining the weight of the agricultural implement taken up by the take-up means substantially constant.

In a further aspect of the invention the compensating means is configured to maintain the value of the turning moment induced by the take-up element about the fulcrum substantially constant as the carrier element moves upwardly and downwardly relative to the mounting element within the normal working range of the upward and downward movement of the carrier element relative to the mounting element.

In another aspect of the invention the compensating means is configured for maintaining the distance between the first and second anchorages substantially constant as the carrier element moves upwardly and downwardly relative to the mounting element within the normal working range of the upward and downward movement of the carrier element relative to the mounting element.

In a further aspect of the invention the spacing between the compensating pivot axis and the first anchorage on the compensating means is sized so that as the carrier element moves upwardly and downwardly relative to the mounting element within the normal working range of the upward and downward movement of the carrier element relative to the mounting means, the spacing between the first and second anchorages remains substantially constant.

In one aspect of the invention the linkage mechanism comprises an upper link member and a lower link member, the upper link member being coupled to the mounting element about a first upper pivot axis, and the lower link member being pivotally coupled to the mounting element about a first lower pivot axis, at a level spaced apart below the first upper pivot axis, the first upper and lower pivot axes extending substantially parallel to each other, and substantially transversely of the direction of normal forward motion of the coupling apparatus.

In another aspect of the invention the first lower pivot axis defines the fulcrum about which the carrier element is pivotal relative to the mounting element.

In another aspect of the invention the upper and lower link members of the linkage mechanism are coupled to the carrier element about respective second upper and lower pivot axes extending substantially transversely of the direction of normal forward motion of the coupling apparatus, the second lower pivot axis being located at a level spaced apart below the second upper pivot axis.

Preferably, the perpendicular spacing between the first and second upper pivot axes is less than the perpendicular spacing between the first and second lower pivot axes.

In another aspect of the invention the compensating means is configured for maintaining the first anchorage at a level above the first lower pivot axis.

In a further aspect of the invention the compensating means is configured for maintaining the first anchorage at a level above the first upper pivot axis.

In one aspect of the invention the actuator element acts between the compensating means and one of the upper and lower link members of the linkage mechanism. Preferably, the actuator element is coupled to the lower link member.

In another aspect of the invention the second anchorage is located on the lower link member.

Preferably, the compensating means comprises a compensating arm.

In one aspect of the invention the carrier element is located forwardly of the mounting element relative to the direction of normal forward motion of the coupling apparatus.

Preferably, the compensating means extends generally rearwardly from the compensating pivot axis relative to the direction of normal forward motion of the coupling apparatus as the compensating means urges the first anchorage between the predefined upper state and the predefined lower state.

Advantageously, the second anchorage is secured to the lower link member at a location forwardly of the first anchorage and spaced apart therefrom.

In one aspect of the invention the take-up element extends between a first end and a second end, the second end being spaced apart from the first end and being resiliently connected to the first end, the first end of the take-up element being connected to the first anchorage, and the second end of the take-up element being connected to the second anchorage.

In another aspect of the invention the compensating means is configured for maintaining the spacing between the first and second ends of the take-up element substantially constant as the carrier element moves upwardly and downwardly relative to the mounting element within the normal working range of the upward and downward movement of the carrier element.

In one aspect of the invention the take-up element comprises an elongated take-up element. Preferably, the take-up element comprises a spring. Advantageously, the take-up element comprises a tension spring acting between the first anchorage and the second anchorage.

Preferably, an adjusting means is provided for adjusting the resilient force applied by the take-up element.

In one aspect of the invention a pair of take-up elements are provided.

Preferably, a compensating means is provided corresponding to each take-up element.

Advantageously, a pair of first anchorages are provided, the first anchorages being located on the respective compensating means.

Ideally, a pair of actuator elements are provided, one actuator element being provided for each compensating means.

In one aspect of the invention the linkage mechanism comprises a pair of transversely spaced apart upper link members.

Preferably, the linkage mechanism comprises a pair of transversely spaced apart lower link members.

In another aspect of the invention the mounting element is adapted for coupling to the three-point linkage of a tractor.

In a further aspect of the invention the mounting element is adapted for coupling to a three-point linkage adjacent the front of a tractor.

Preferably, the coupling apparatus is adapted for coupling a mower to a prime mover.

Advantageously, the coupling apparatus is adapted for coupling a mower to a three-point linkage of a tractor.

In one aspect of the invention the coupling apparatus comprises an implement carried on the carrier element.

In another aspect of the invention the coupling apparatus comprises a mower carried on the carrier element.

Preferably, the mower comprises a ground engaging skid plate.

Additionally the invention provides in combination a prime mover and a mower coupled to the prime mover by the coupling apparatus according to the invention.

The advantages of the invention are many. A particularly important advantage of the invention is that the carrier apparatus according to the invention carries an agricultural implement, such as a mower, such that the effective weight of the mower or other agricultural implement bearing on the ground remains substantially constant as the agricultural implement moves upwardly and downwardly relative to a prime mover, to which the agricultural implement is coupled by the coupling apparatus, over the normal working range of the upward and downward movement of an agricultural implement relative to the mounting element of the coupling apparatus.

Figure 2:
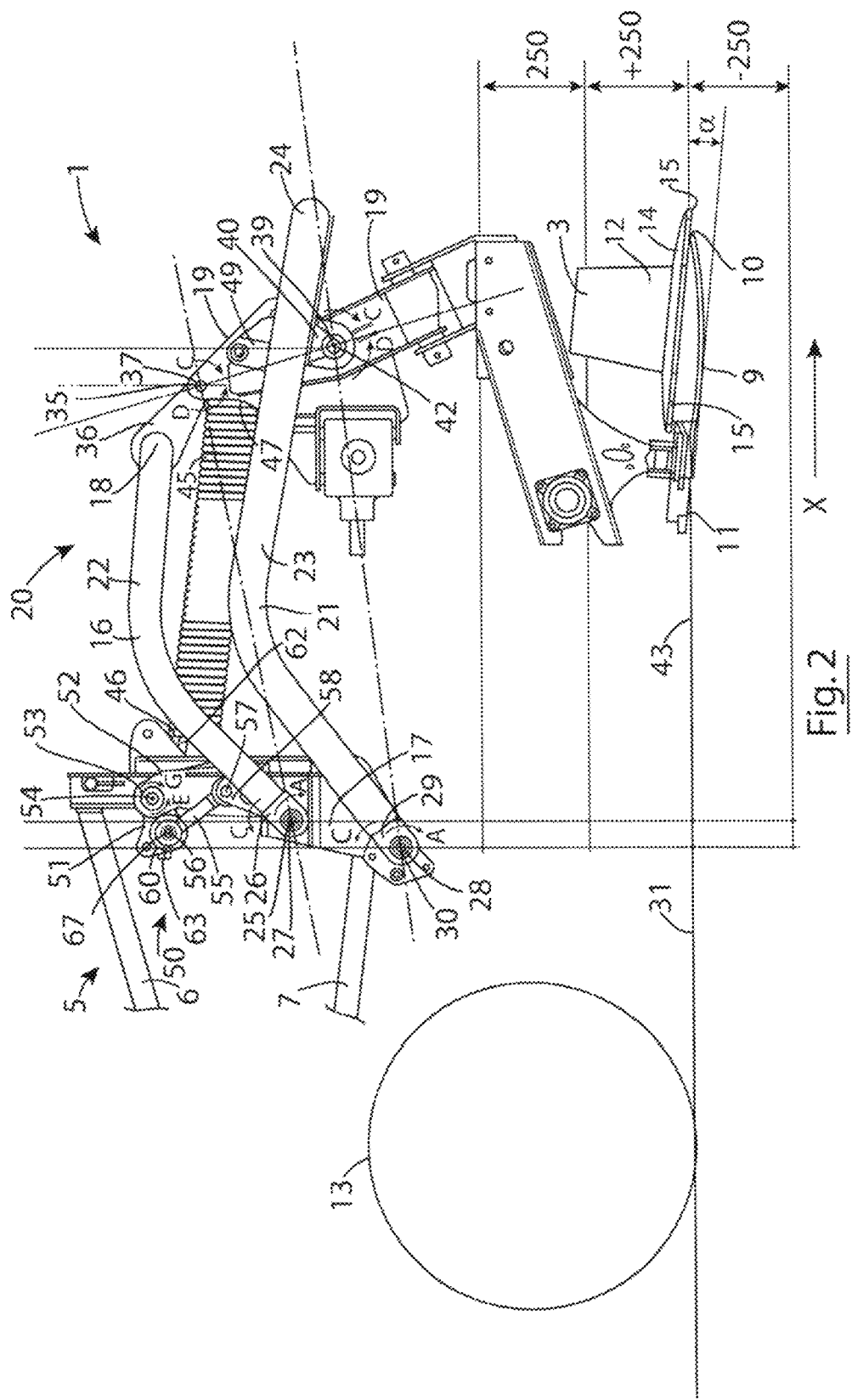
Figure 3:
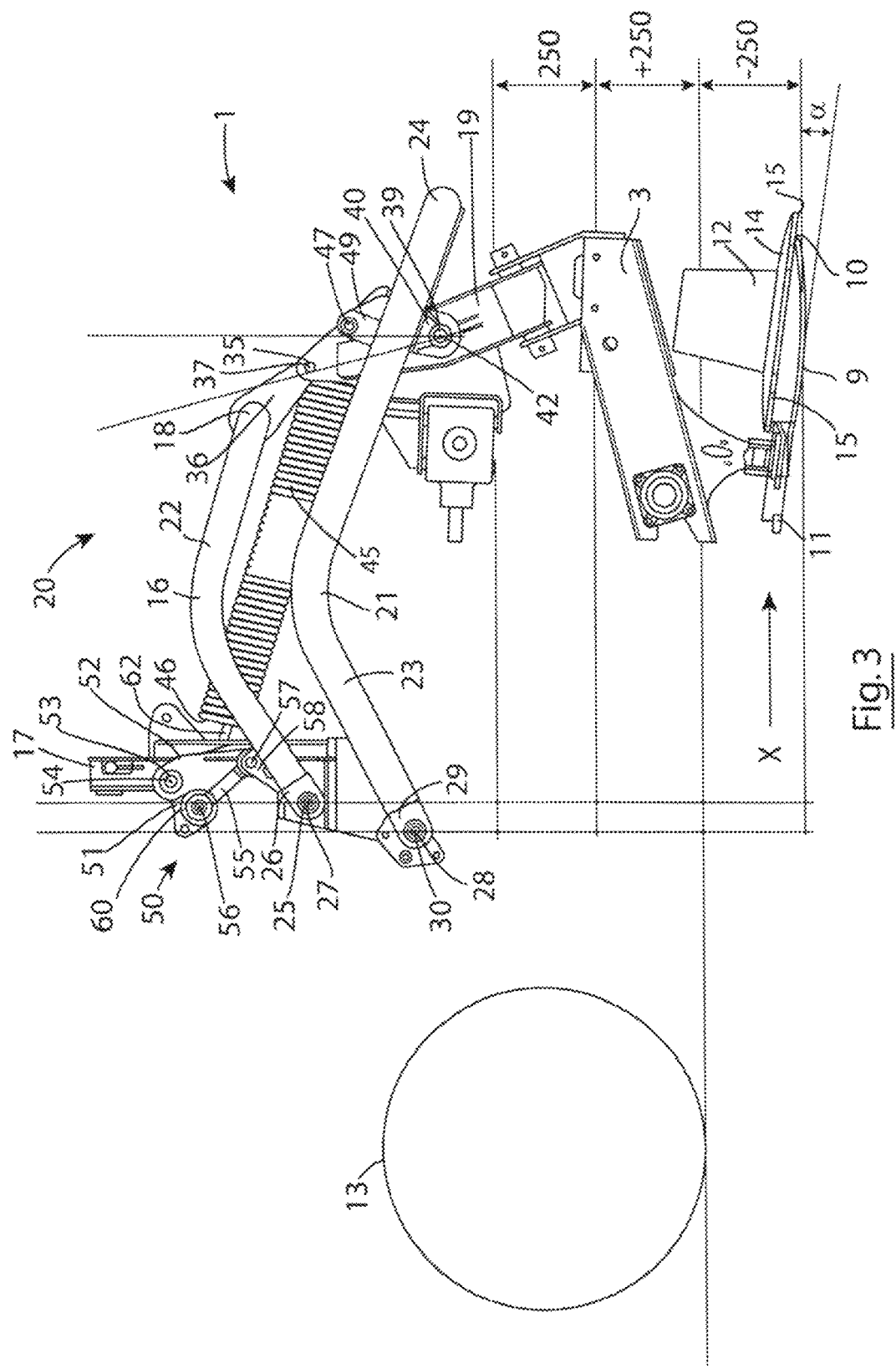
Figure 4:
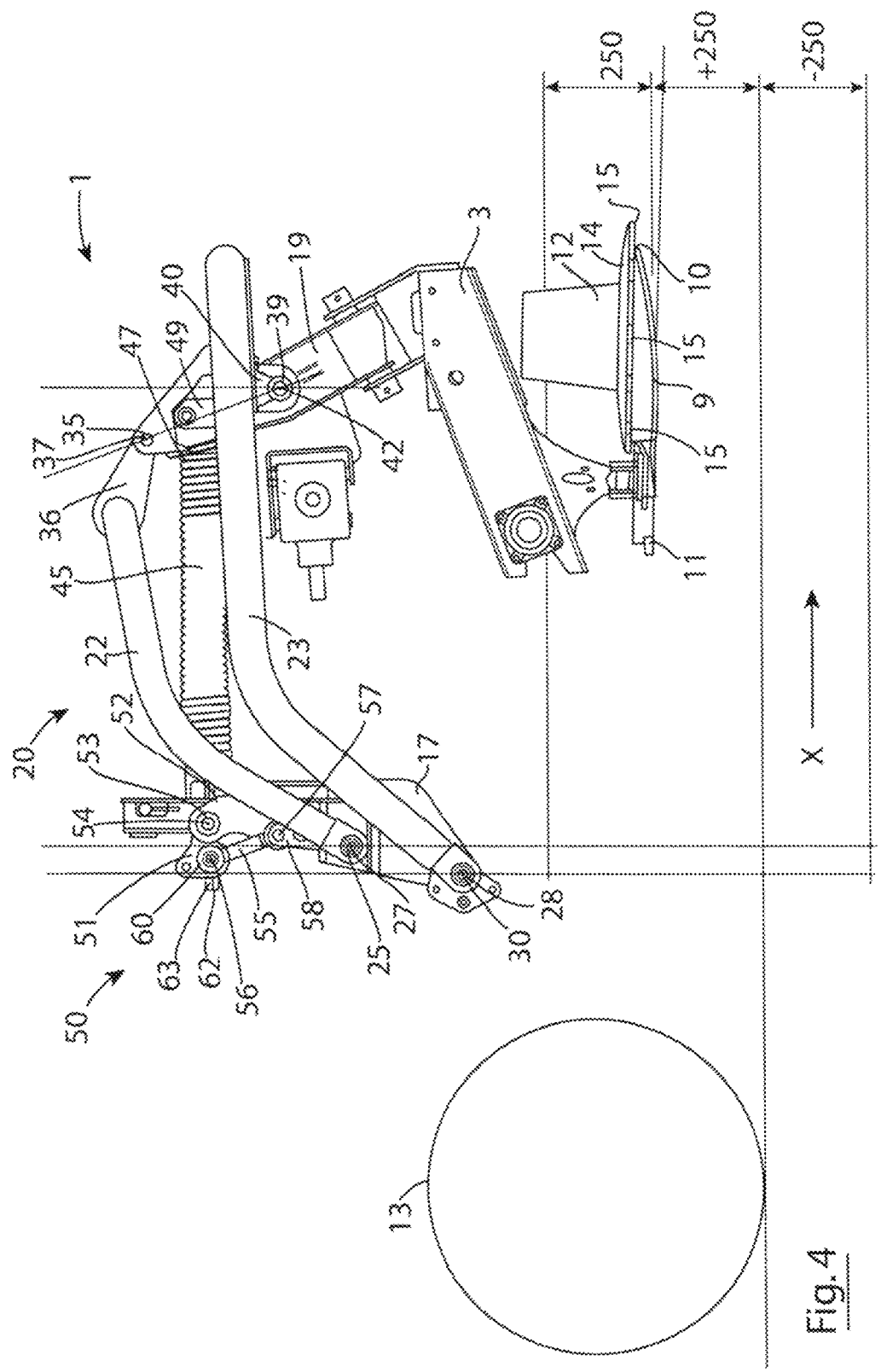
Figure 5:
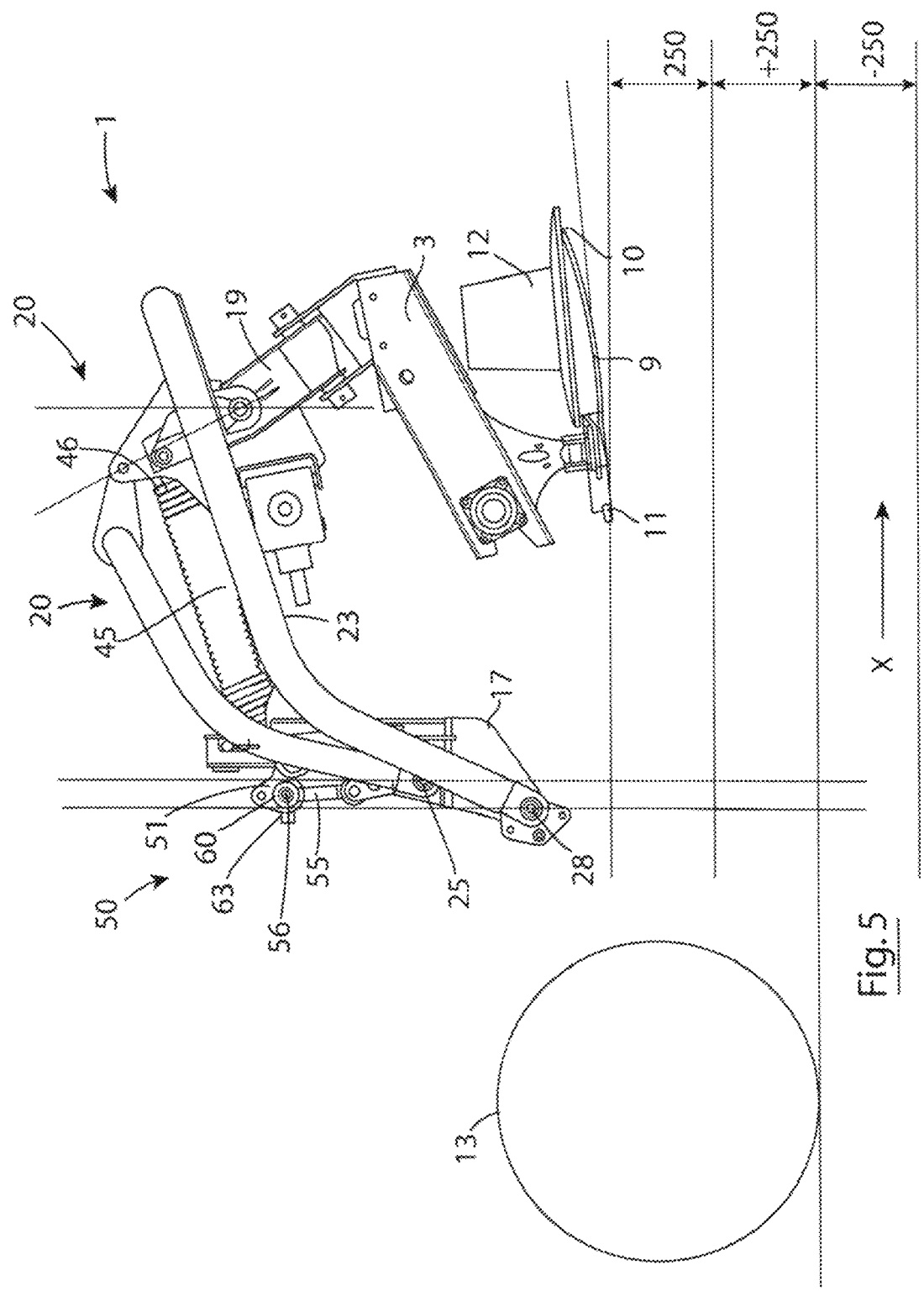
Figure 6:
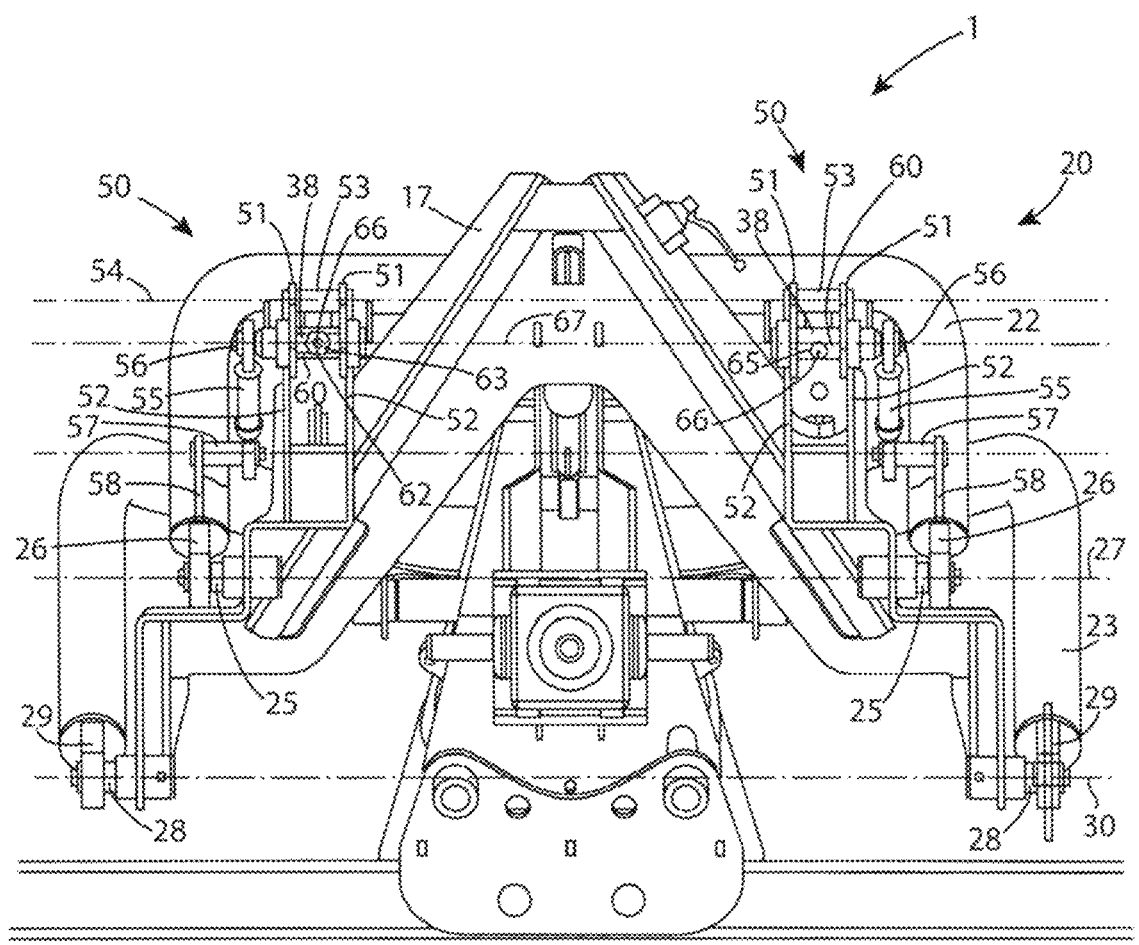
Figure 7:
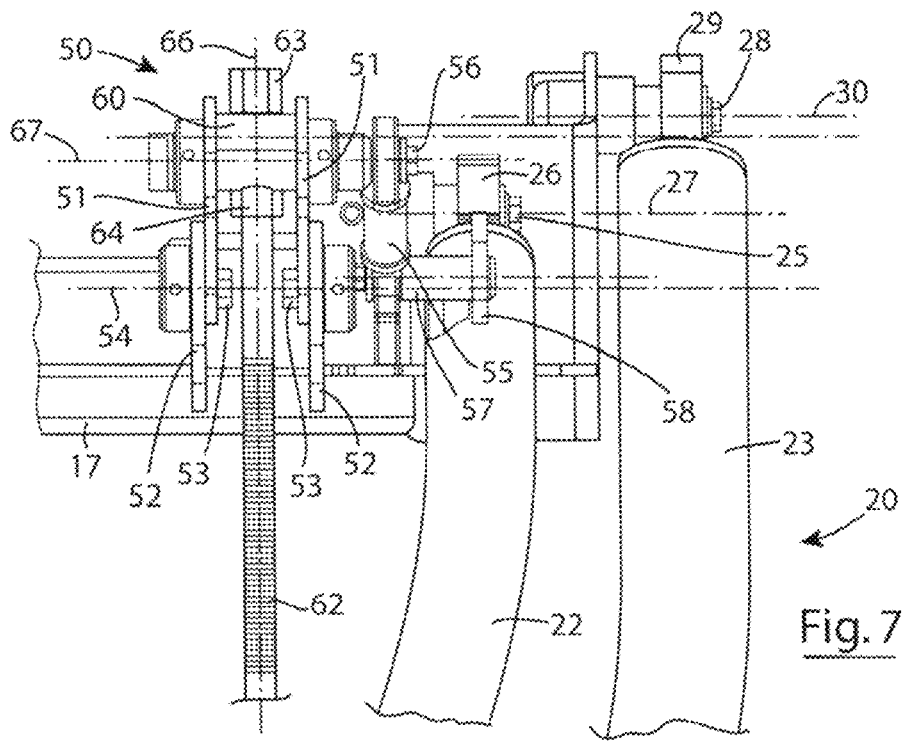
Figure 8:
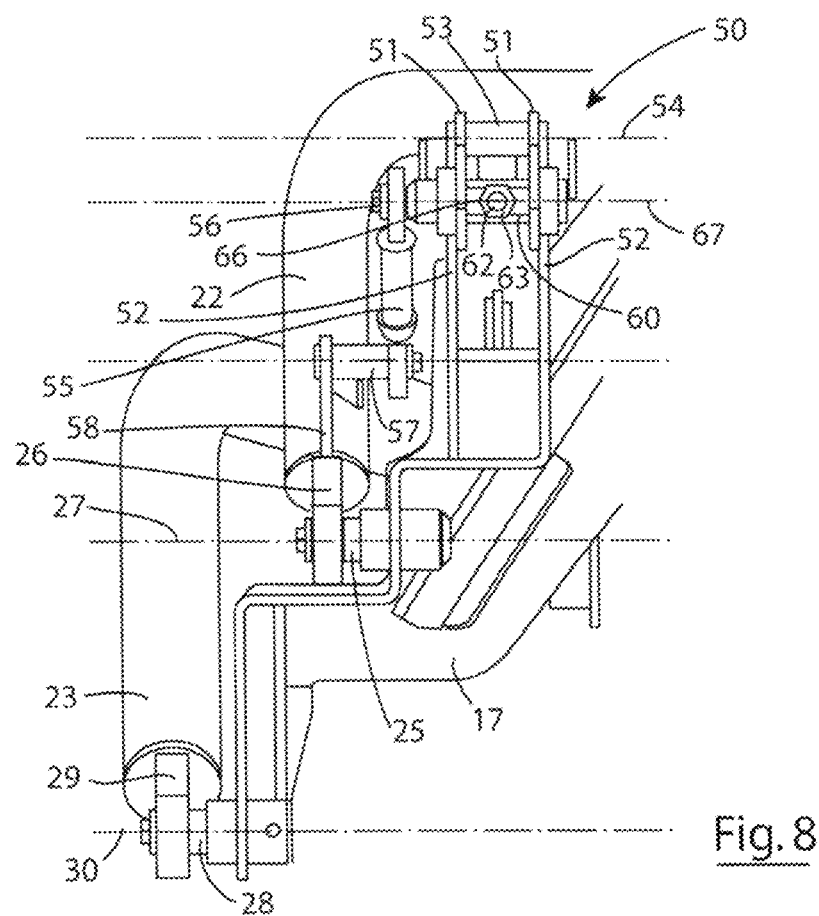
Figure 9:
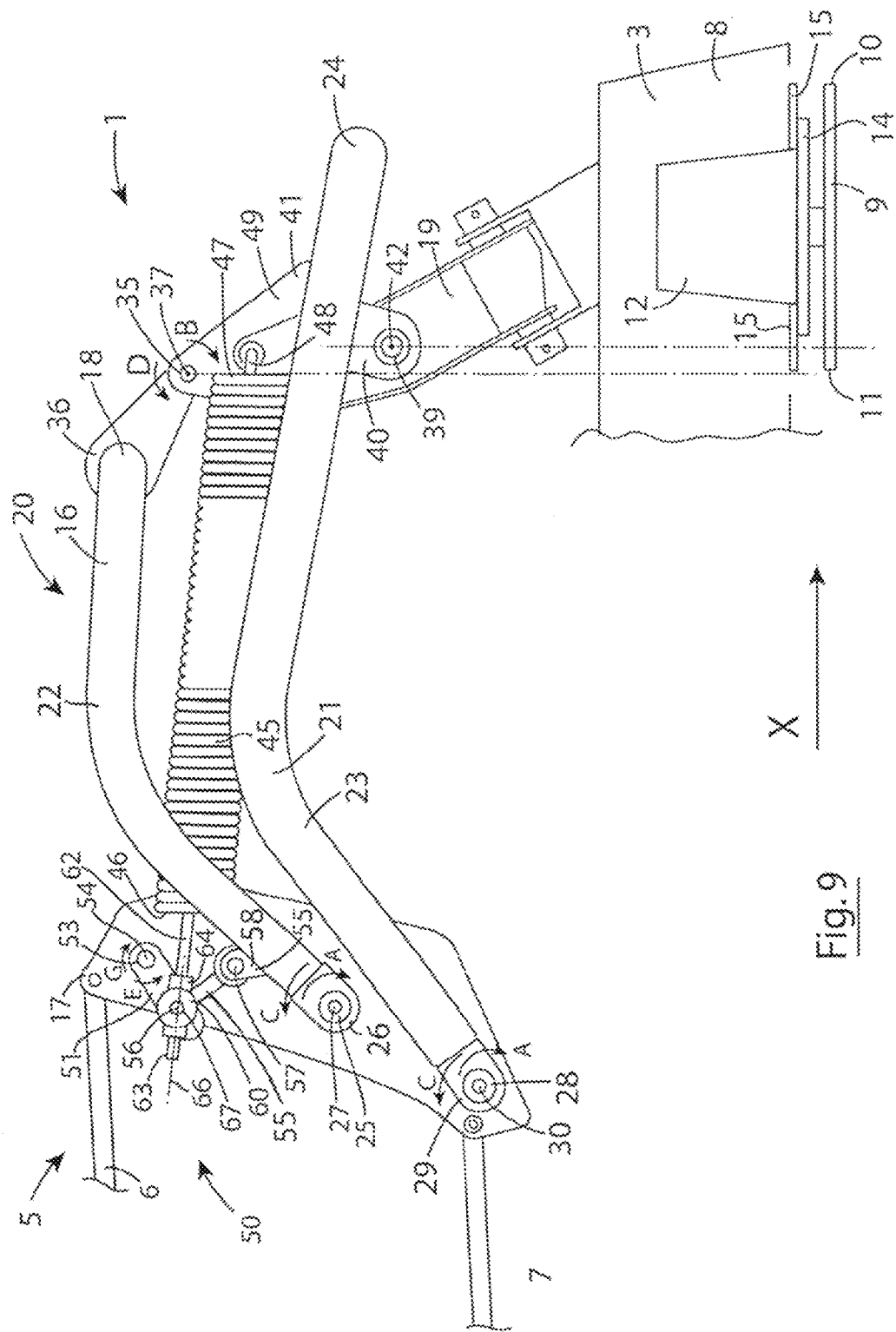
Figure 10:
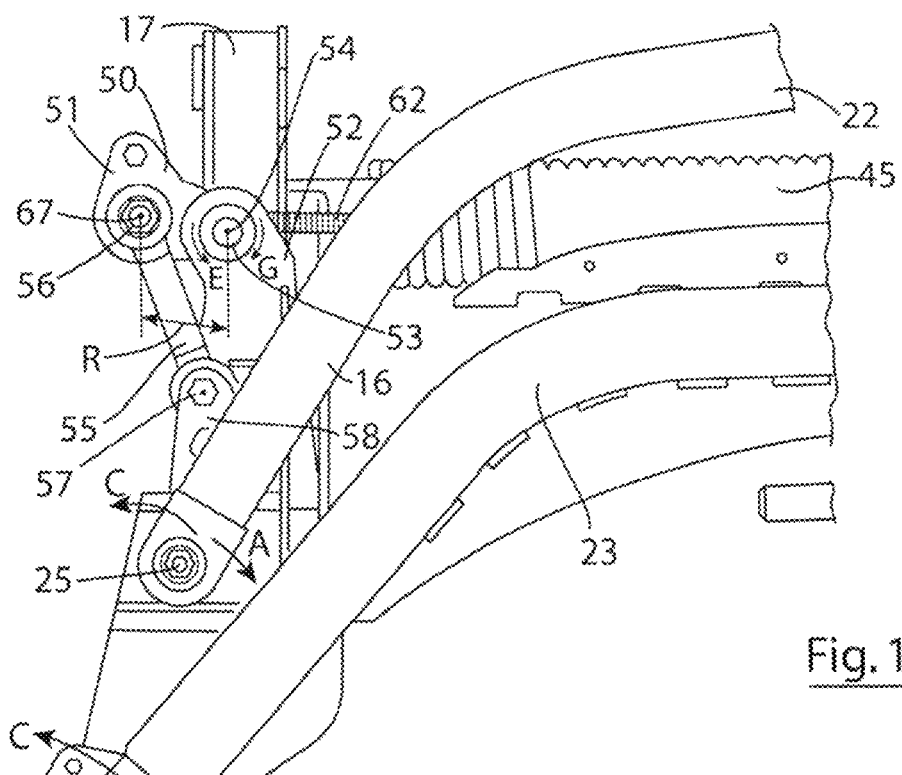
Figure 11:
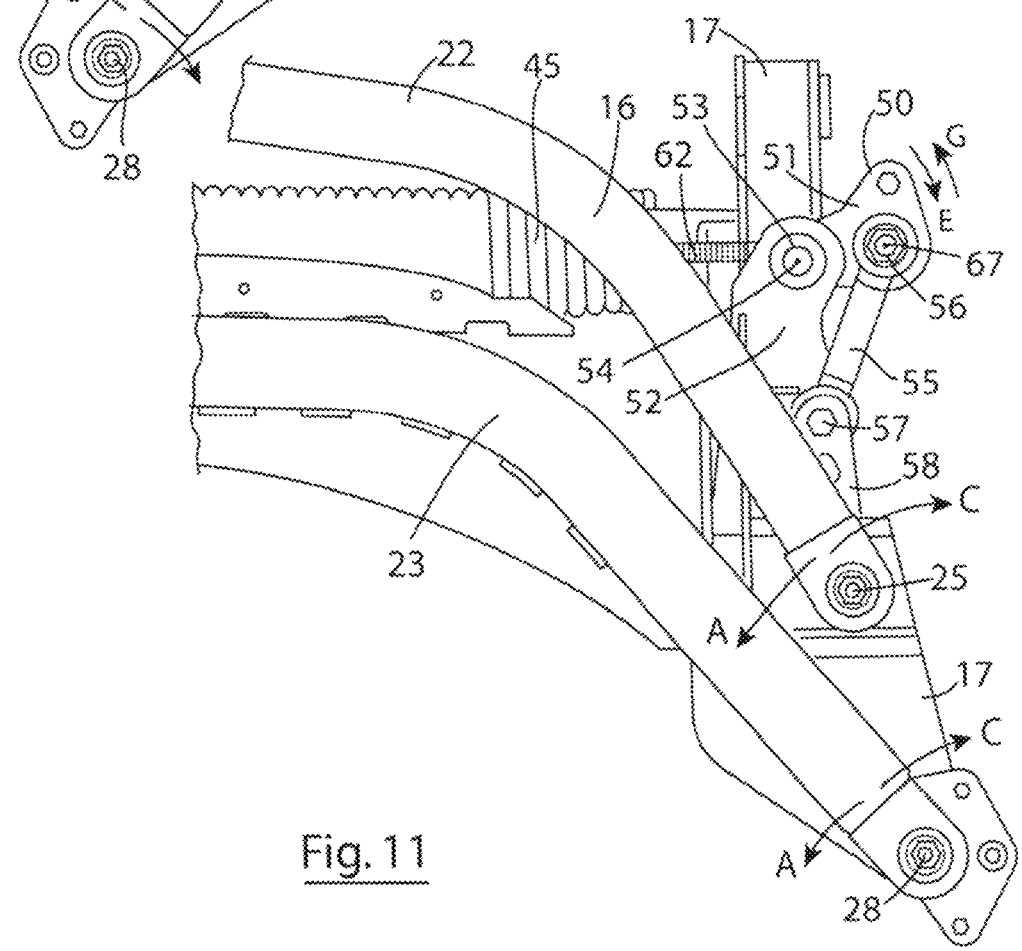
Figure 12:
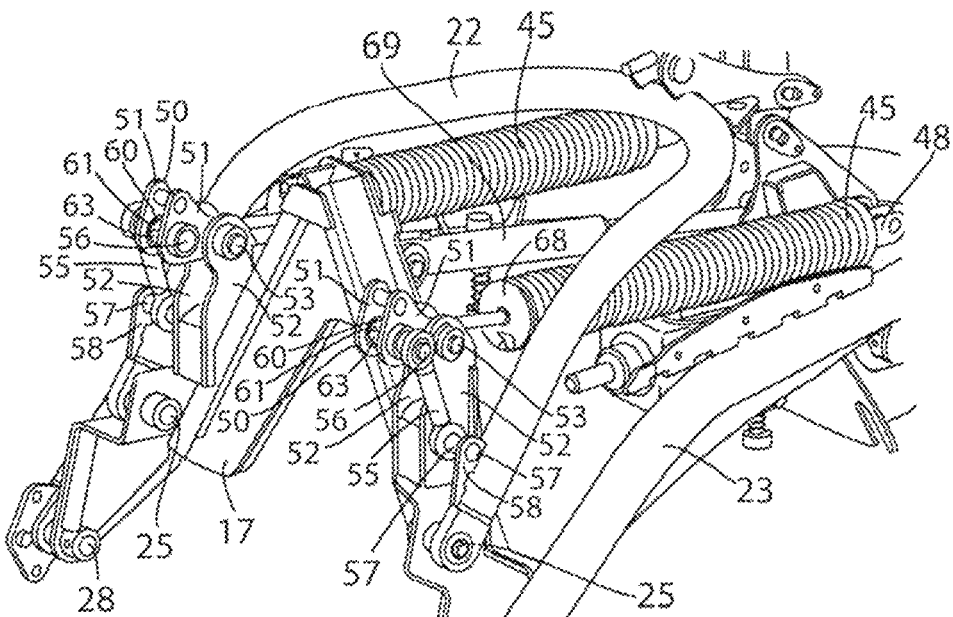
Figure 13:
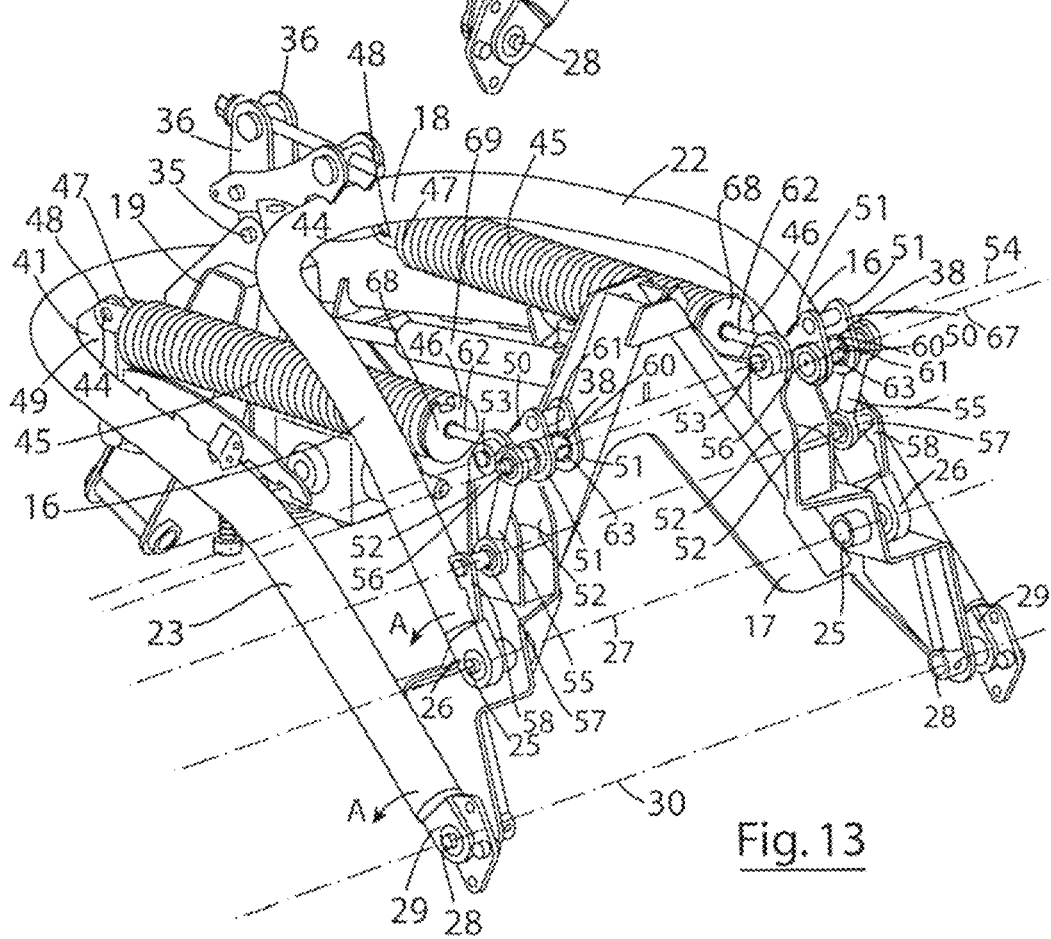
Figure 14:
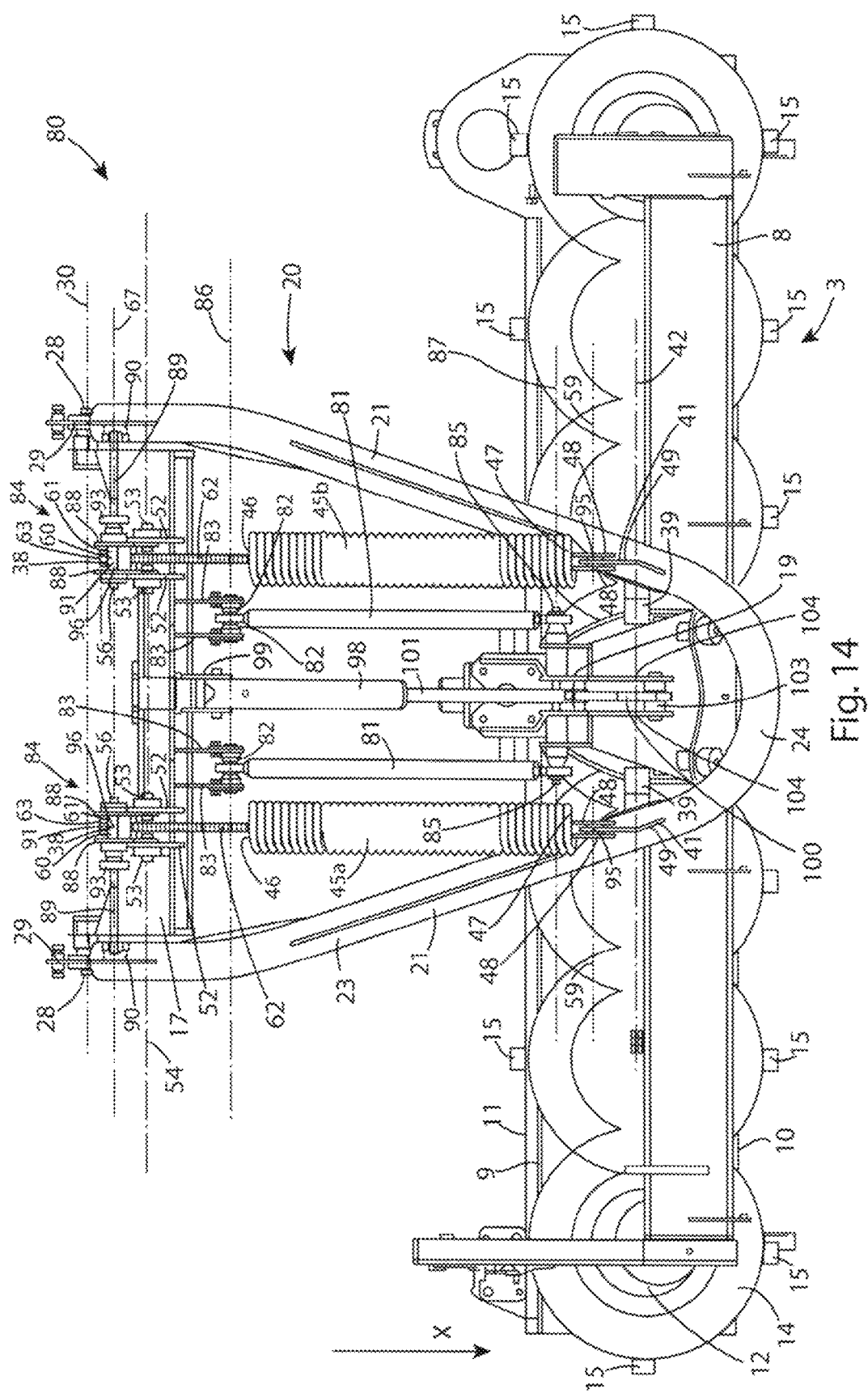
Figure 15:
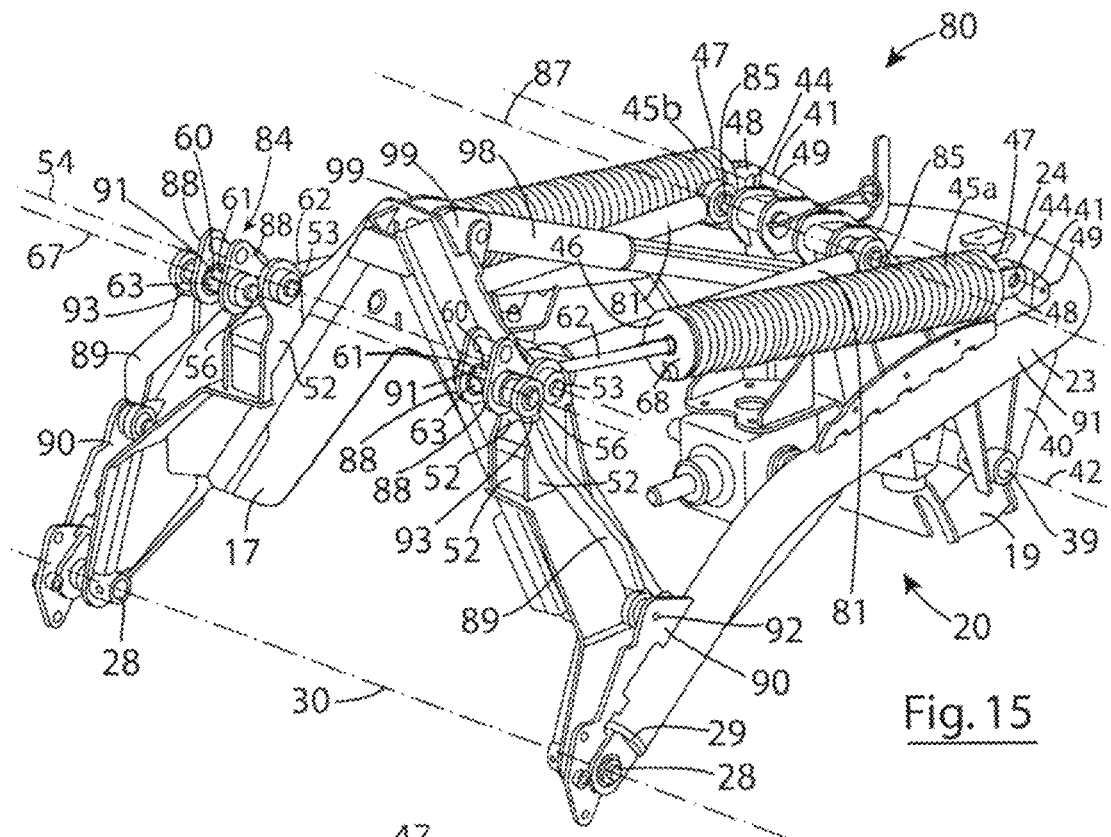
Figure 16:
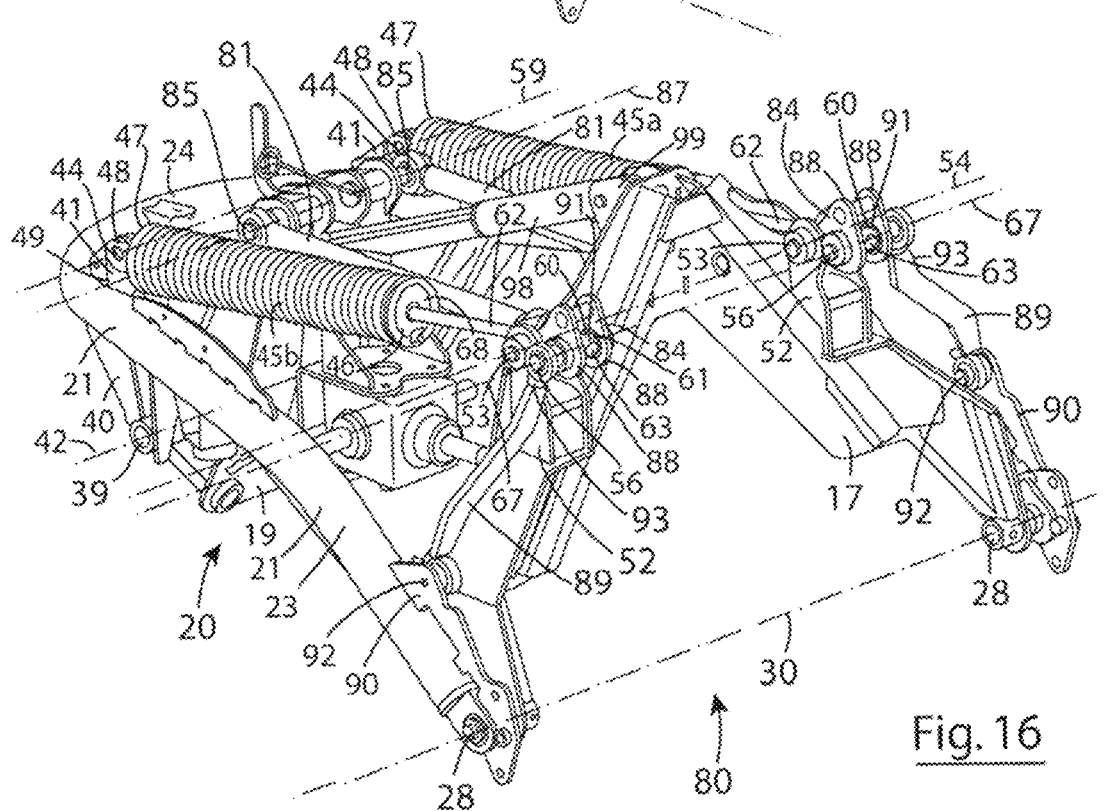
Figure 17:
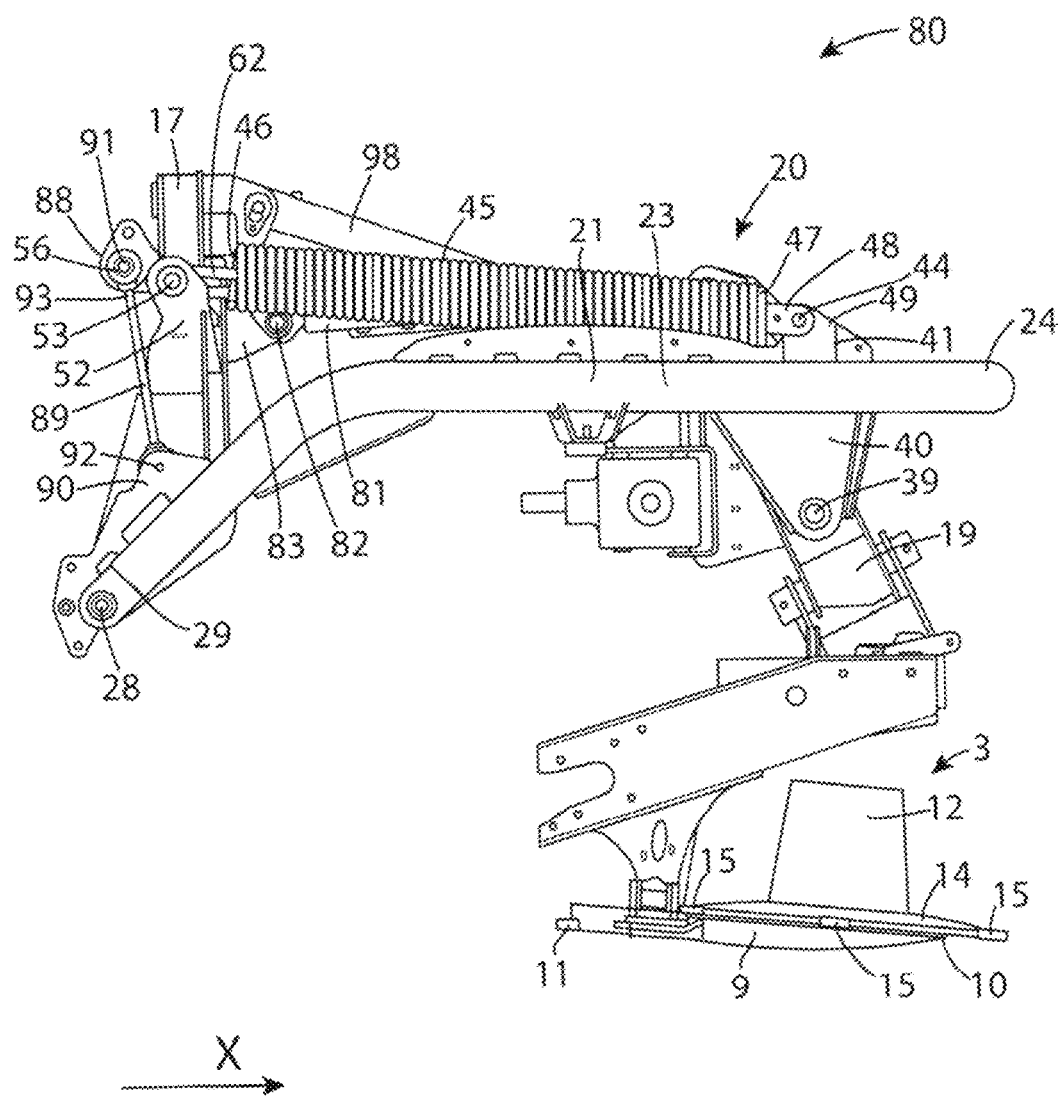
Figure 18:
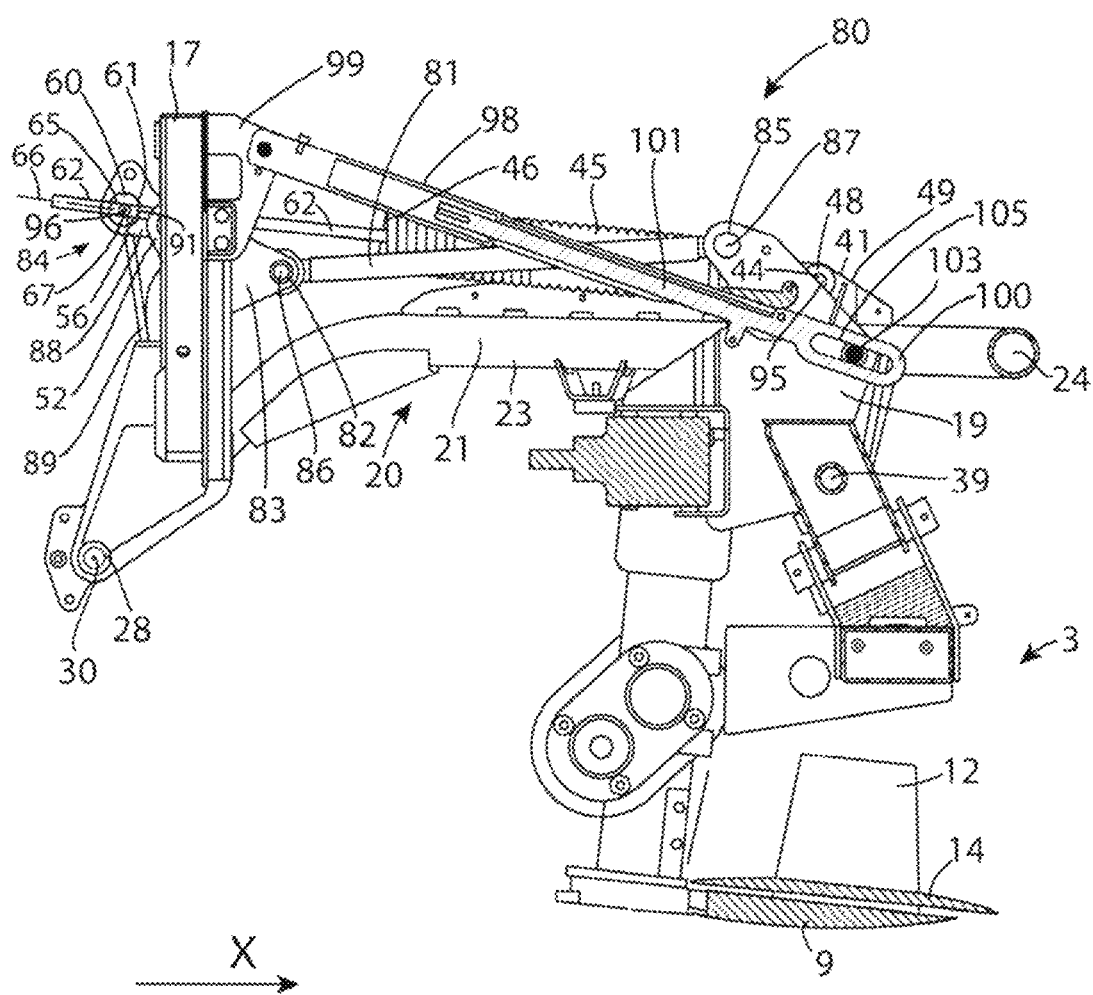
Figure 19:
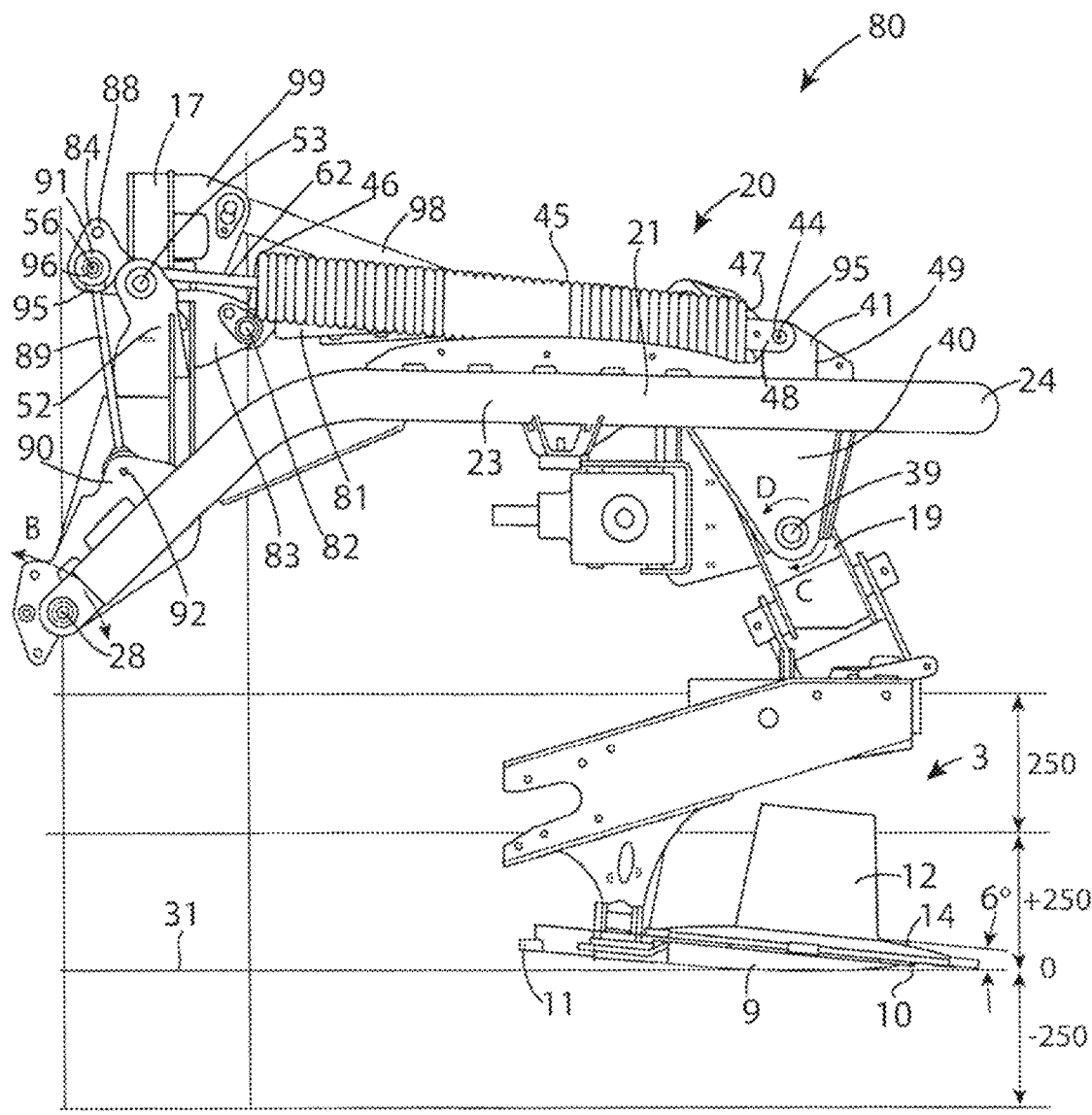
Figure 20:
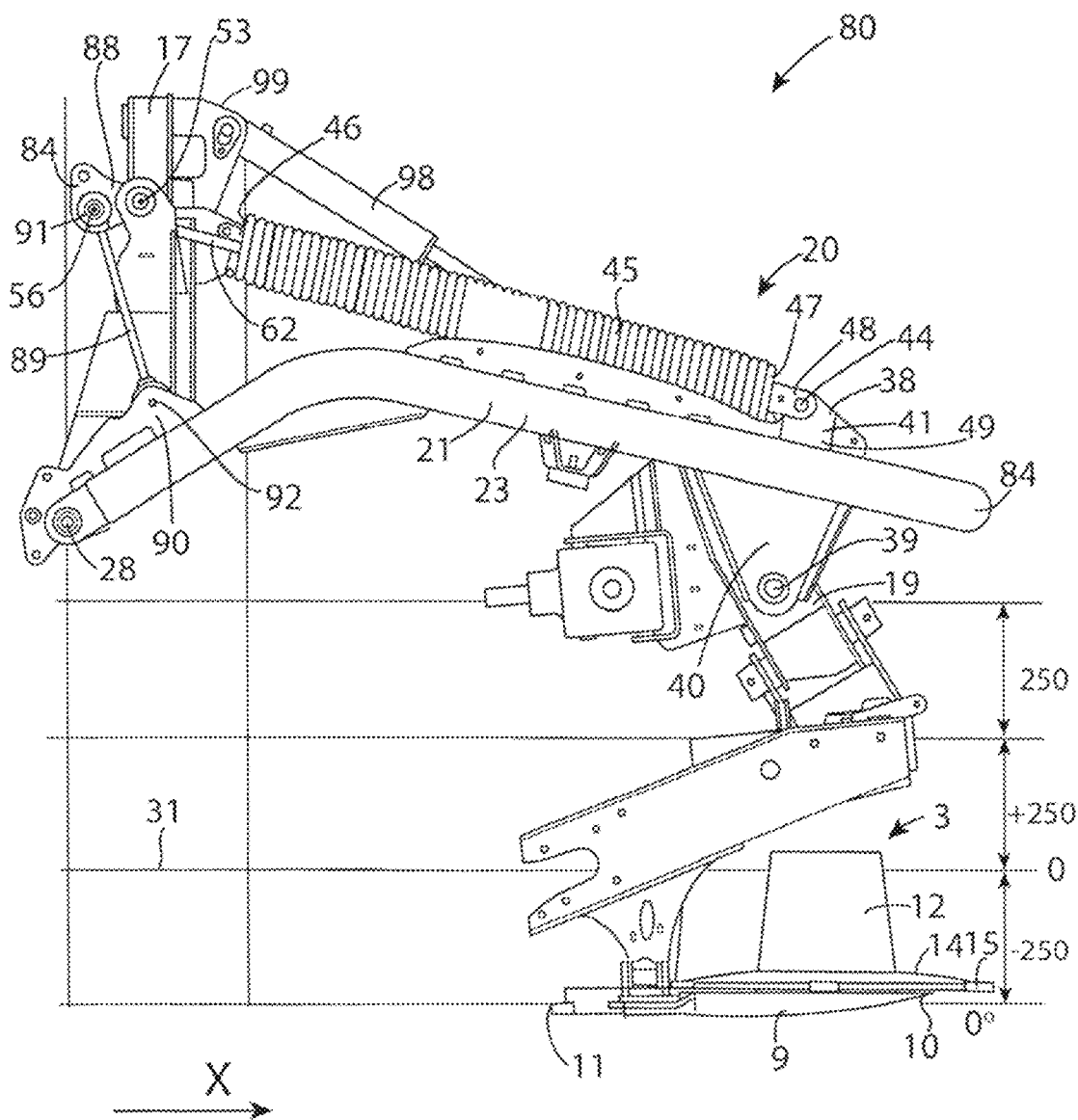
Figure 21:
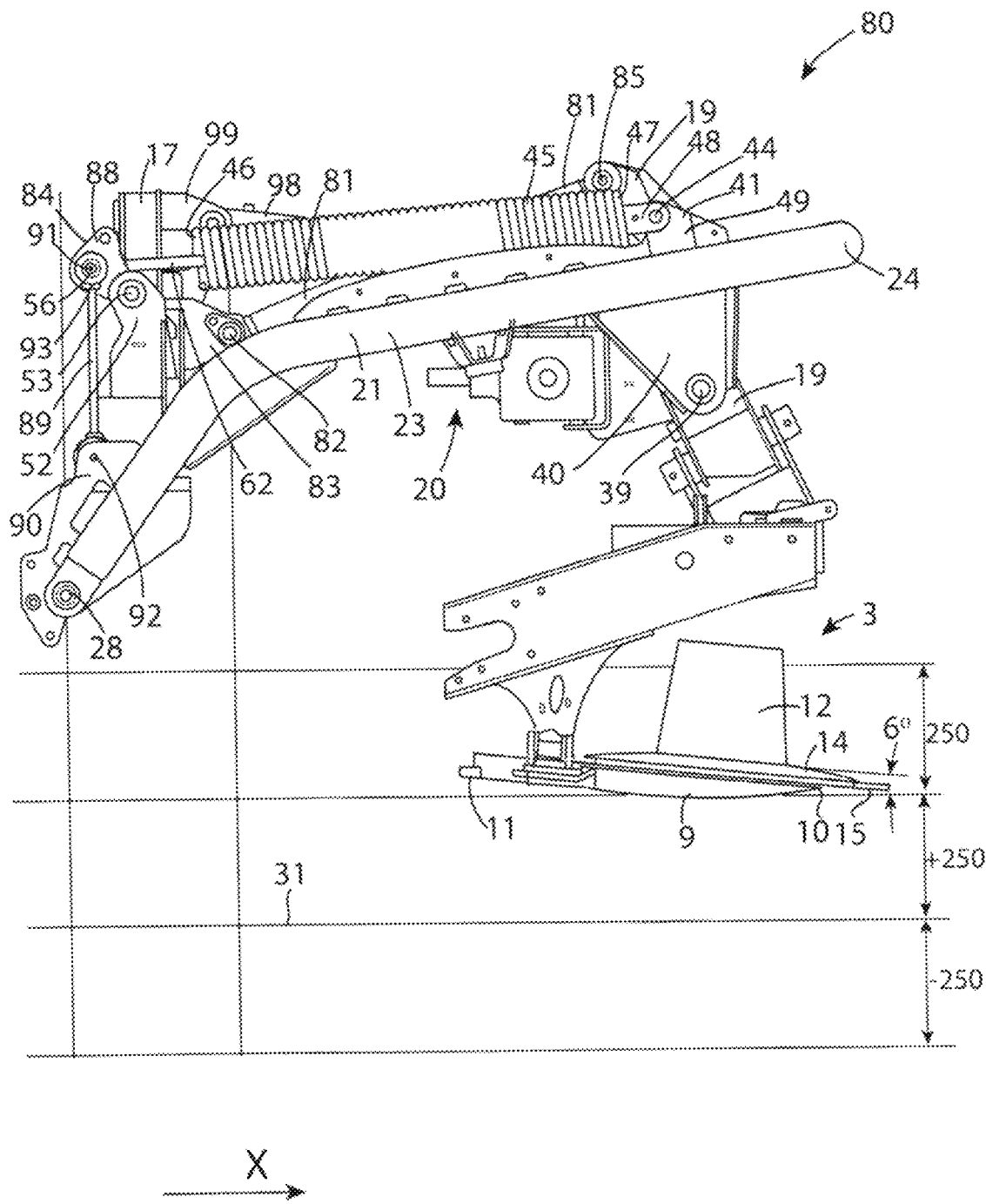
Figure 22:
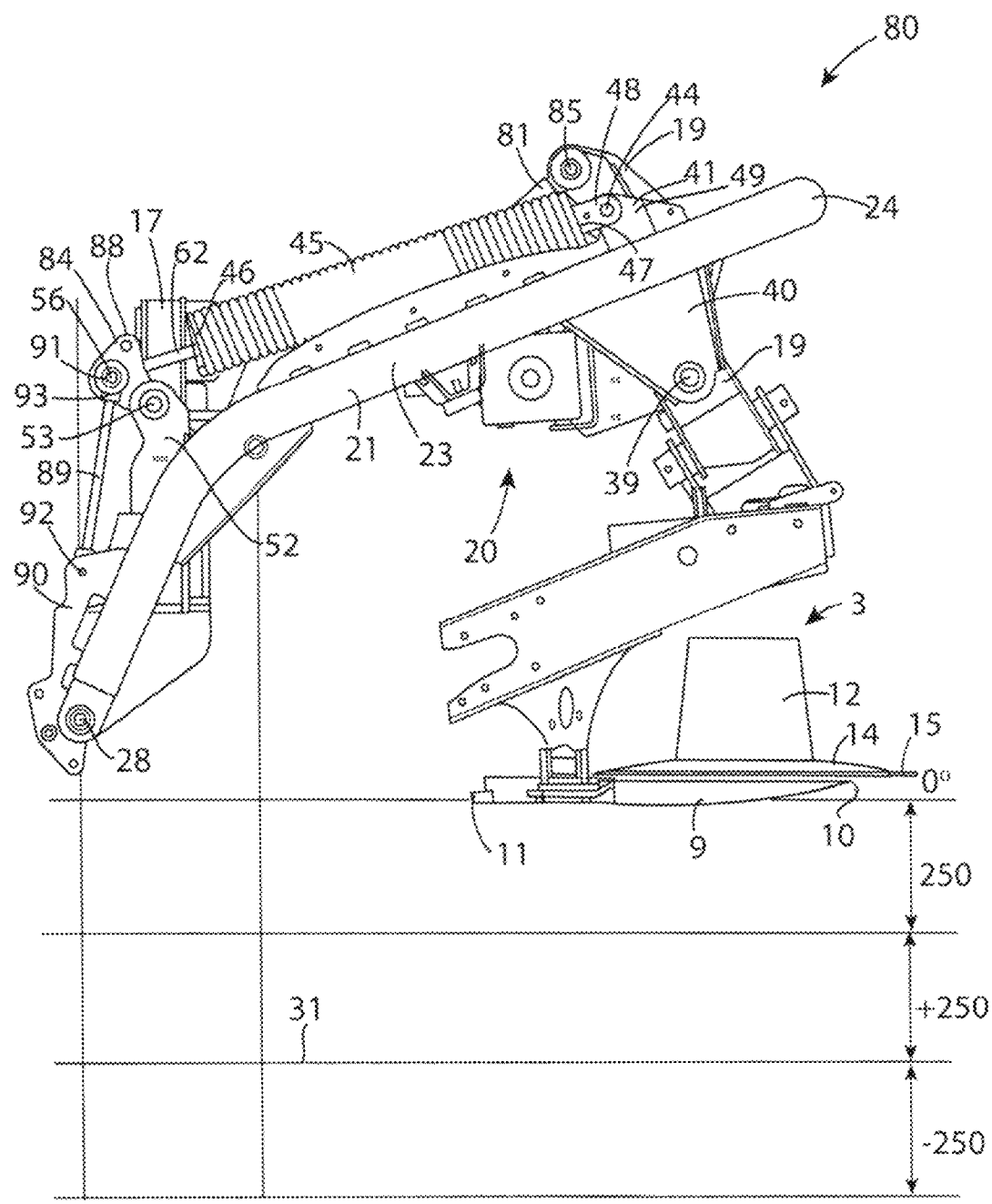
Figure 23:
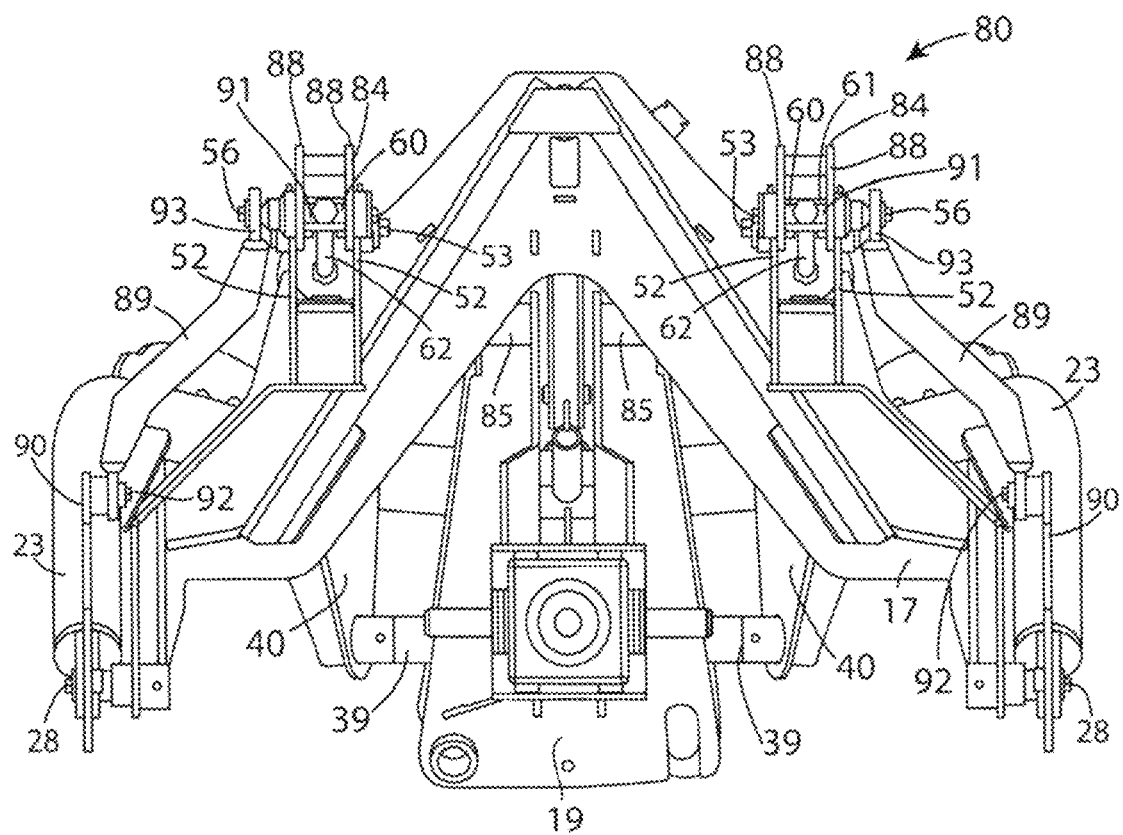
Figure 24:
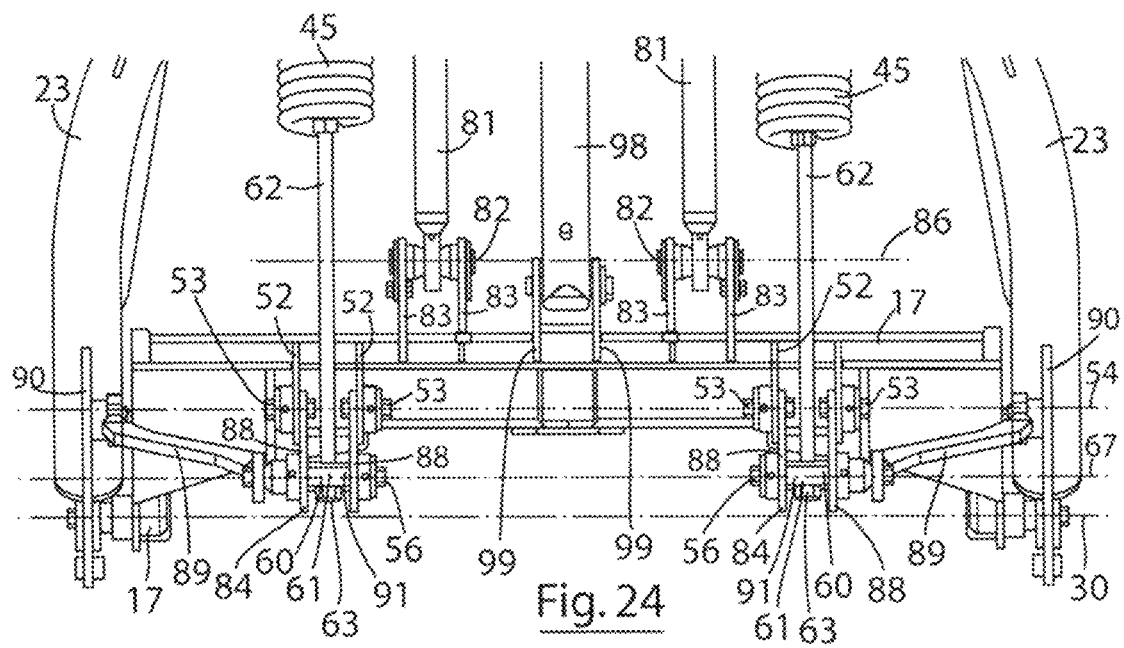
Figure 25:
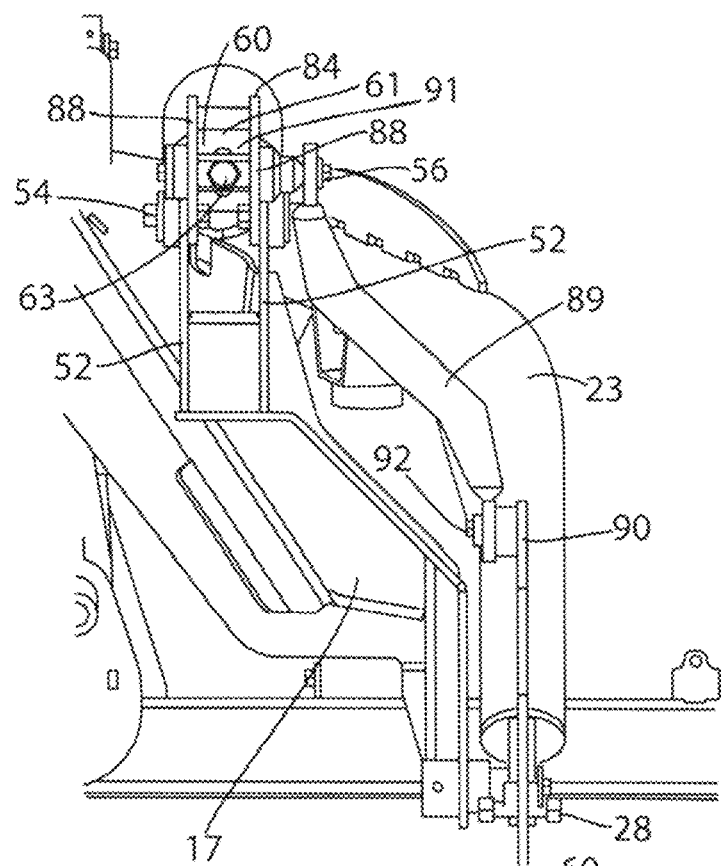
Figure 26:
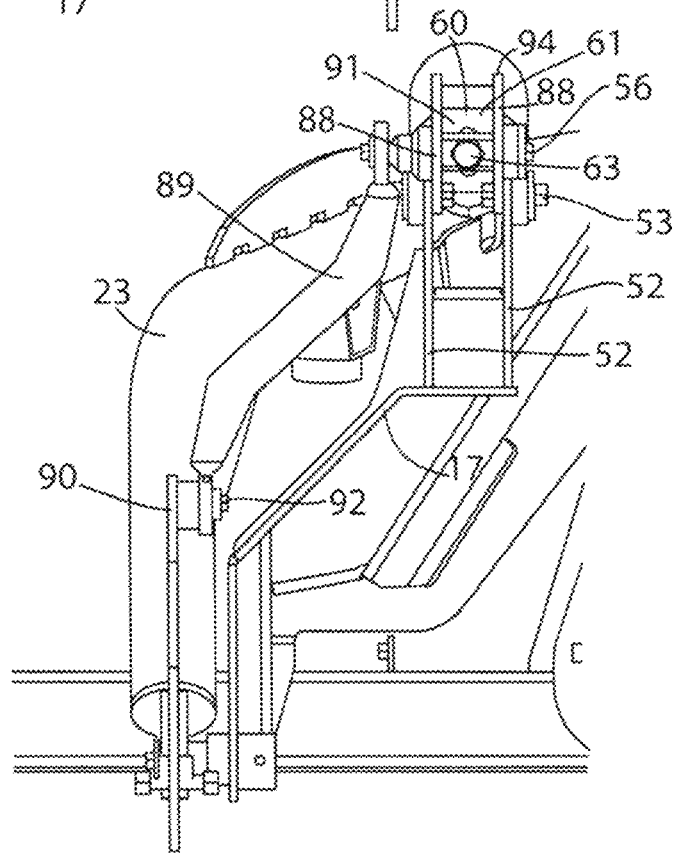
Figures 27, 28:
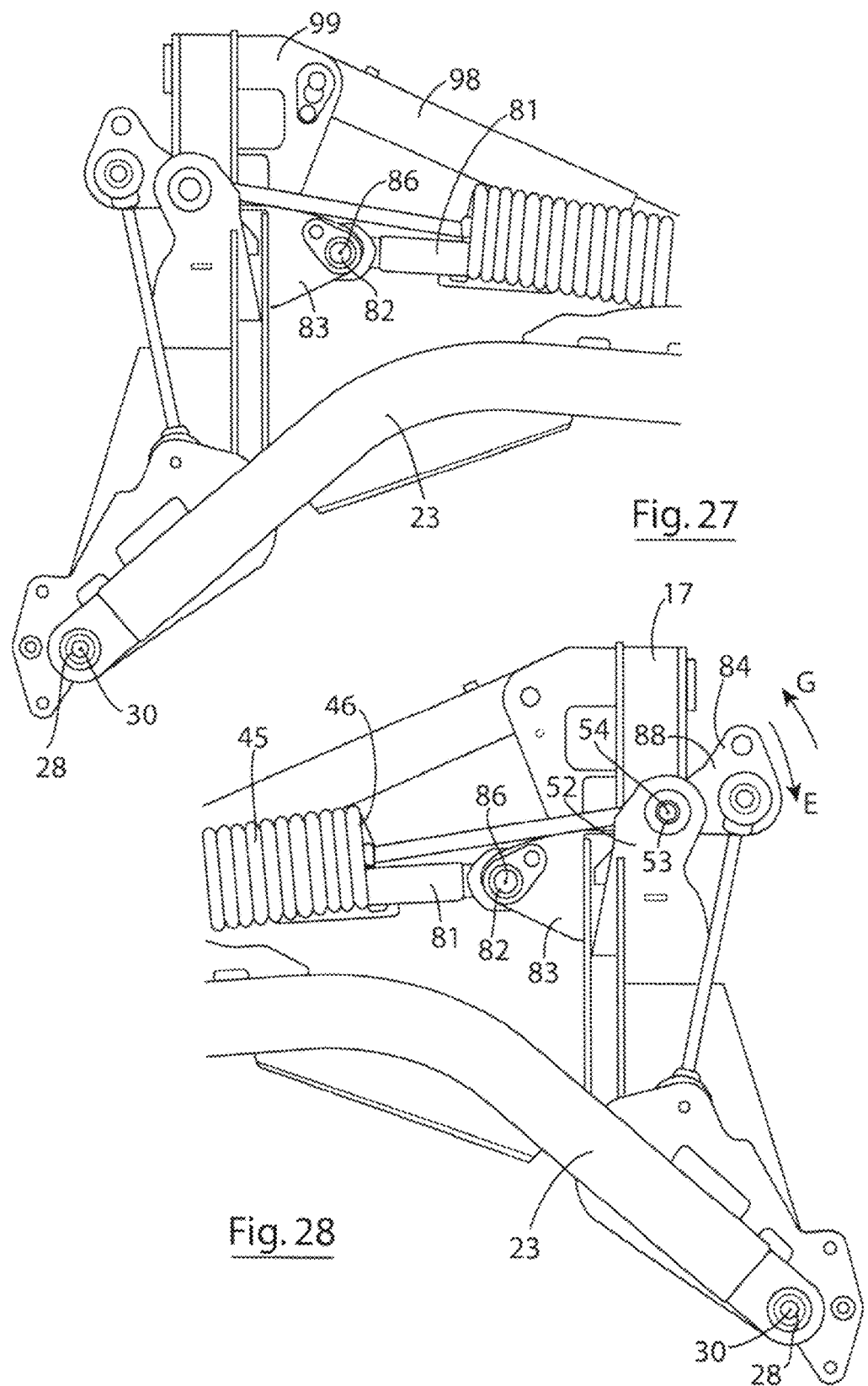
Figure 29:
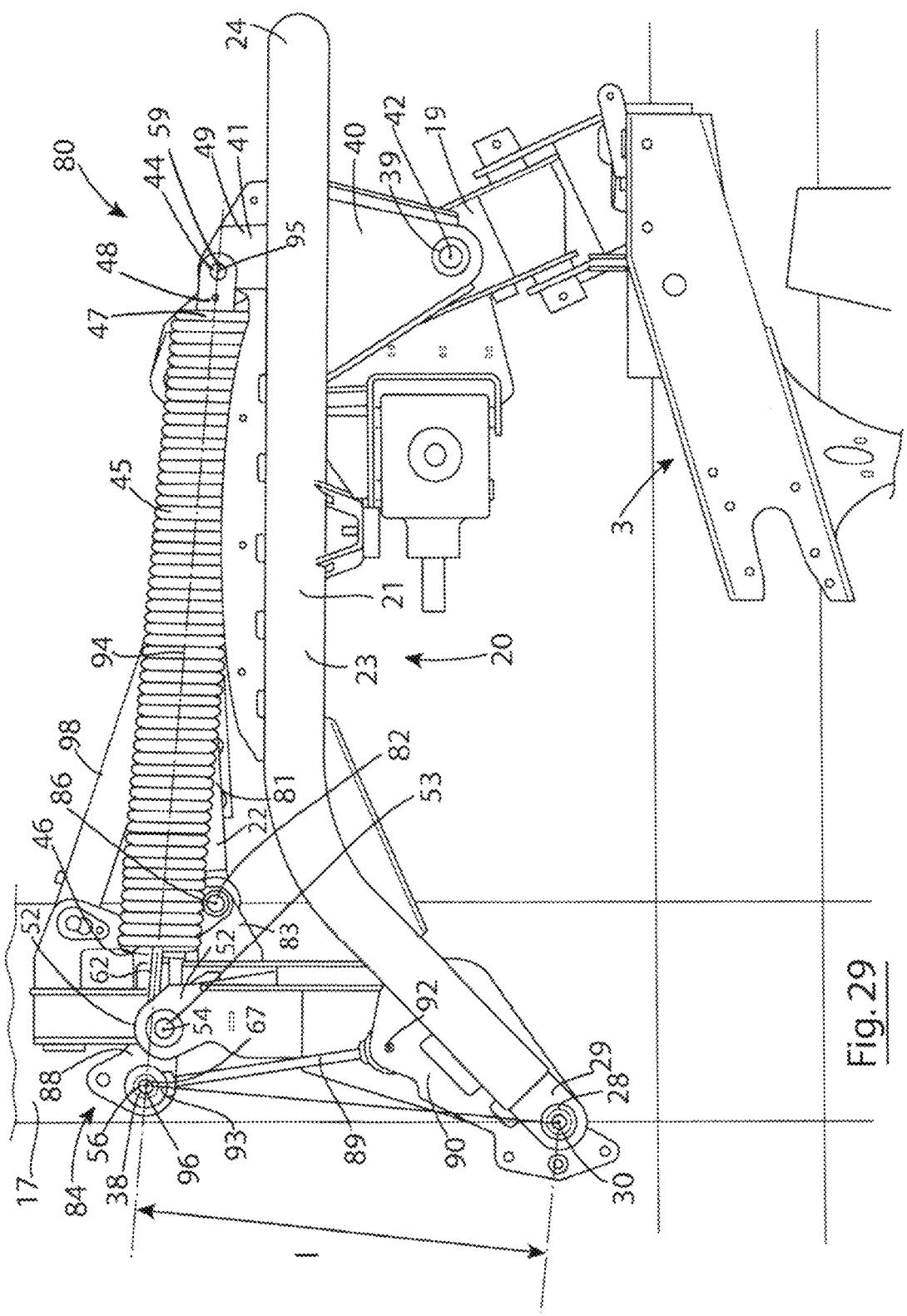
Figure 30:
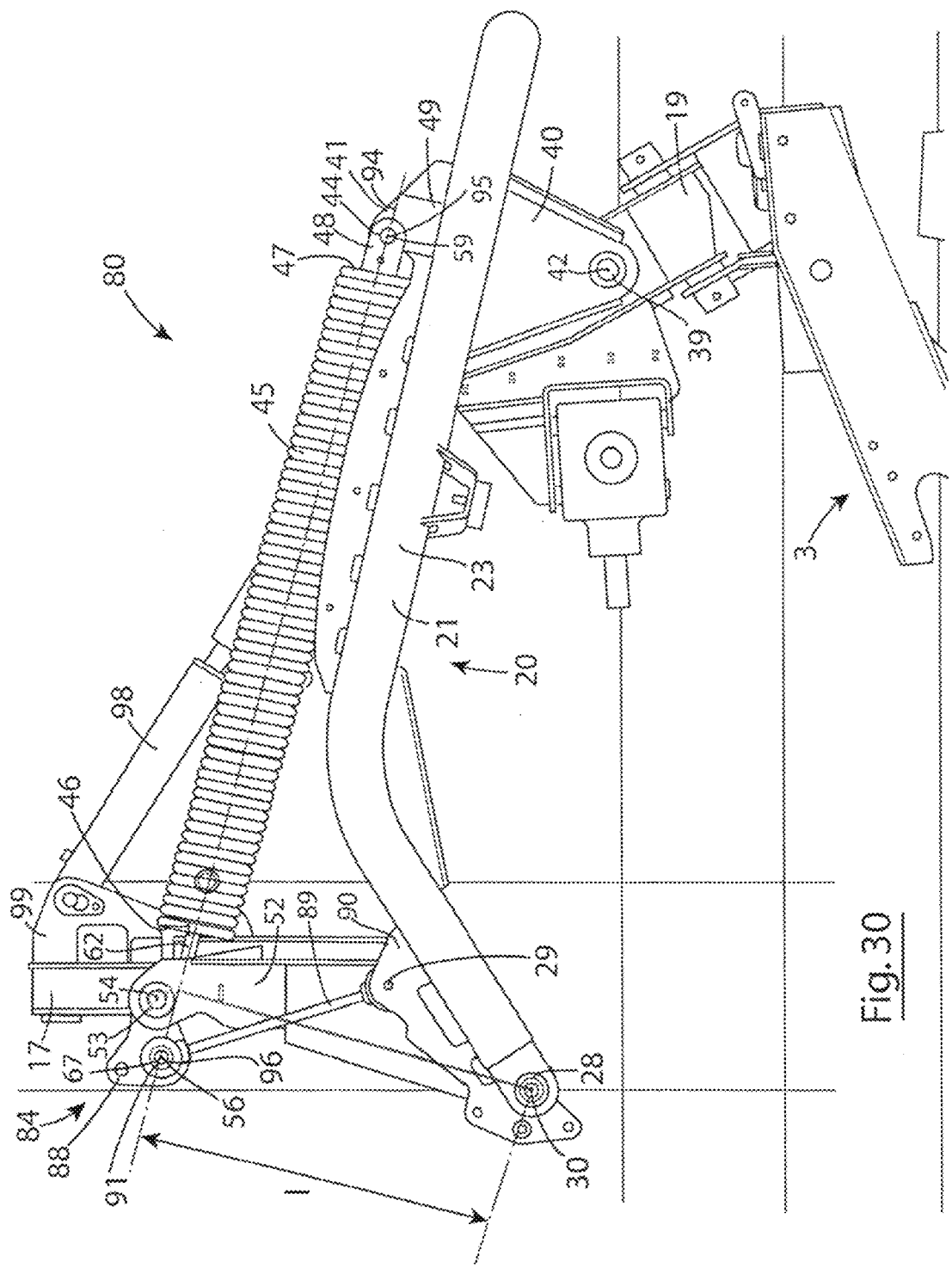
Figure 31:
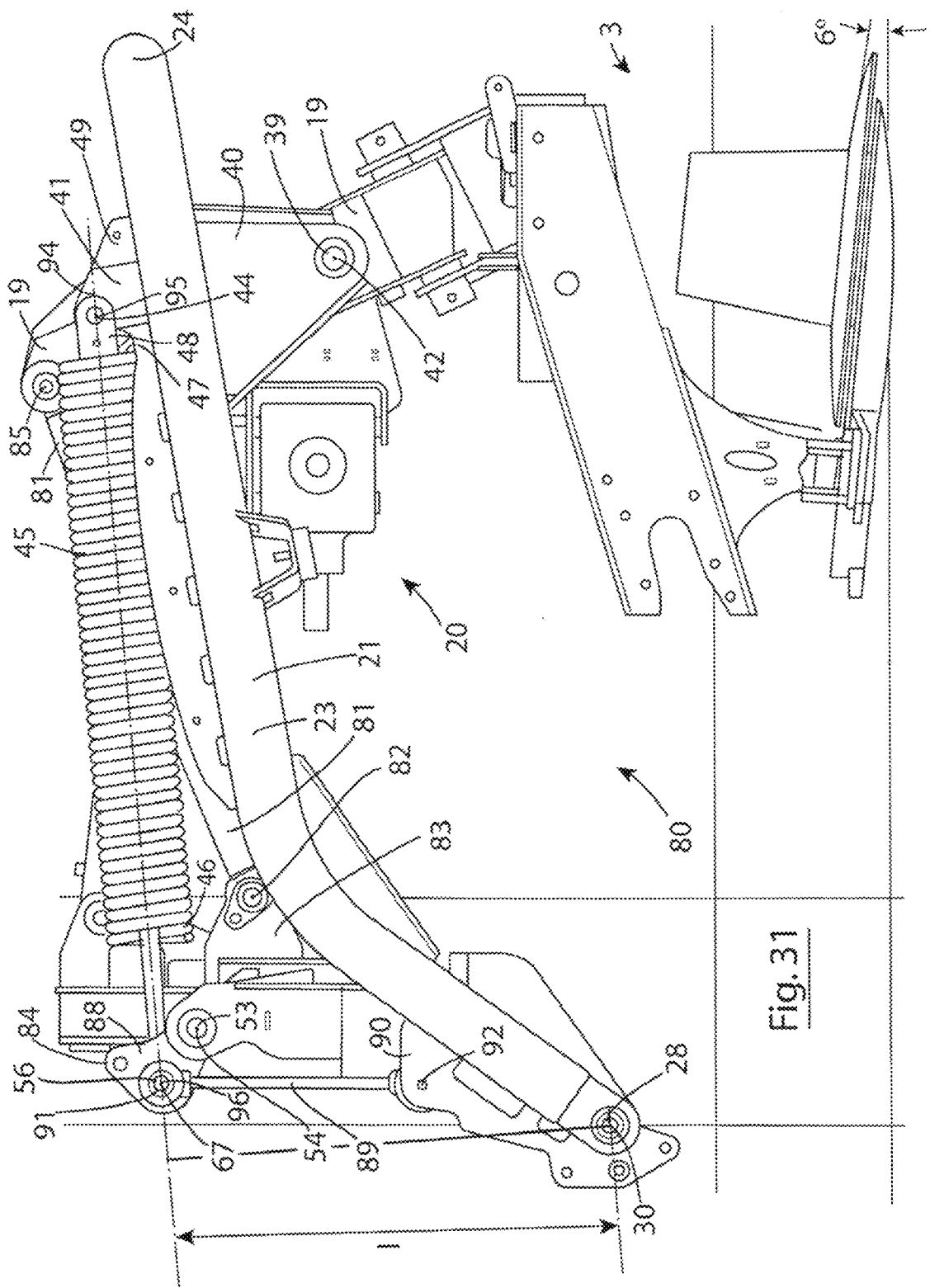

The invention will be more clearly understood from the following description of some preferred embodiments thereof, which are given by way of example only, with reference to the accompanying drawings, in which:

FIG. 1 is a top plan view of a coupling apparatus according to the invention for coupling an agricultural implement to a three-point linkage of a tractor, FIG. 2 is a side elevational view of the coupling apparatus and the agricultural implement of FIG. 1, illustrating the coupling apparatus and the agricultural implement in one state, FIG. 3 is a view similar to FIG. 2 of the coupling apparatus and the agricultural implement of FIG. 1 illustrating the coupling apparatus and the agricultural implement in a different state to that of FIG. 2, FIG. 4 is a view similar to FIG. 2 of the coupling apparatus and the agricultural implement of FIG. 1 illustrating the coupling apparatus and the agricultural implement in another different state to those of FIGS. 2 and 3, FIG. 5 is a view similar to FIG. 2 of the coupling apparatus and the agricultural implement of FIG. 1 illustrating the coupling apparatus and the agricultural implement in a further different state to those of FIGS. 2 to 4, FIG. 6 is a rear end elevational view of the coupling apparatus of FIG. 1, FIG. 7 is a top plan view of a detail of the coupling apparatus of FIG. 1, FIG. 8 is a rear end elevational view of the detail of FIG. 8 of the coupling apparatus of FIG. 1, FIG. 9 is a diagrammatic side elevational view illustrating the principle of the operation of the coupling apparatus of FIG. 1, FIG. 10 is a side elevational view of a detail of the apparatus of FIG. 1, FIG. 11 is a side elevational view of the apparatus from the opposite side to that of FIG. 10 illustrating another detail of the apparatus of FIG. 1, FIG. 12 is a perspective view of a portion of the apparatus of FIG. 1, FIG. 13 is another perspective view of the portion of the apparatus of FIG. 12, FIG. 14 is a top plan view of coupling apparatus according to another embodiment of the invention for coupling an agricultural implement to a three-point linkage of a tractor, FIG. 15 is a perspective view of the coupling apparatus of FIG. 14, FIG. 16 is another perspective view of the coupling apparatus of FIG. 14, FIG. 17 is a side elevational view of the coupling apparatus of FIG. 14, FIG. 18 is a cross-sectional side elevational view of the coupling apparatus of FIG. 14, FIG. 19 is a side elevational view of the coupling apparatus of FIG. 14, FIG. 20 is a side elevational view of the coupling apparatus of FIG. 14 illustrating the coupling apparatus in a different position to that of FIG. 19, FIG. 21 is a side elevational view of the coupling apparatus of FIG. 14 illustrating the coupling apparatus in a different state to that of FIG. 19, FIG. 22 is another side elevational view of the coupling apparatus of FIG. 14 illustrating the coupling apparatus in a still further different state to that of FIG. 19, FIG. 23 is a rear end view of the coupling apparatus of FIG. 14, FIG. 24 is a top plan view of a portion of the coupling apparatus of FIG. 14, FIG. 25 is a rear end elevational view of a portion of the coupling apparatus of FIG. 14, FIG. 26 is a rear end elevational view of another portion of the coupling apparatus of FIG. 14, FIG. 27 is a side elevational view of a portion of the coupling apparatus of FIG. 14, FIG. 28 is a side elevational view from the other side to that of FIG. 27 of another portion of the coupling apparatus of FIG. 14, FIG. 29 is an enlarged side elevational view of the coupling apparatus of FIG. 14 illustrating the coupling apparatus in a state similar to that of FIG. 19, FIG. 30 is a view similar to FIG. 29 of the coupling apparatus of FIG. 14 in the state of FIG. 20, and FIG. 31 is a view similar to FIG. 29 of the coupling apparatus of FIG. 14 with the coupling apparatus in the state of FIG. 21.

Referring to the drawings, and initially to FIGS. 1 to 13, there is illustrated coupling apparatus according to the invention, indicated generally by the reference numeral 1, for coupling a mower 3 to a forward three-point linkage 5 of a tractor (not shown). Only a portion of the three-point linkage 5, namely, a portion of the upper link 6 and a portion of the two lower links 7, and a front wheel 13 of the tractor are illustrated, see FIGS. 1 and 2 where the portions of the three-point linkage are illustrated, and FIGS. 2 to 5 where the front wheel 13 is illustrated. Such forward three-point linkages of a tractor will be well known to those skilled in the art for coupling a mower or other implement to the front of a tractor or other prime mover, and further description should not be necessary. The coupling apparatus 1 couples the mower 3 to the forward end of a tractor, with the direction of normal forward motion of the mower 3 being in the direction of the arrow X. The coupling apparatus 1 as will be described in detail below is configured to allow the mower 3 to rise and fall relative to the tractor as the mower 3 is urged by the tractor along the ground, and to take up some of the weight of the mower 3, and to maintain the weight with which the mower 3 bears on the ground substantially constant within the normal working range of upward and downward movement of the mower 3 relative to the tractor, which will also be described below.

The mower 3 comprises a housing, a portion 8 of which is illustrated, and within which a ground engaging skid plate 9 is housed. The skid plate 9 comprises a leading edge 10 and a trailing edge 11, and carries a plurality of spaced apart mowing elements 12 mounted on the skid plate 9. Each mowing element 12 comprises a rotatably mounted disc 14 which carries a plurality of radially extending cutting blades 15 equi-spaced apart circumferentially around the periphery thereof for cutting the crop to be mowed. Such mowers 3 will be well known to those skilled in the art, and further description of the mower 3 should not be necessary.

Turning now to the coupling apparatus 1, the coupling apparatus 1 comprises a mounting element 17 which is adapted for coupling to the upper and lower links 6 and 7 of the three-point linkage 5 of the tractor. A carrier element 19 carries the mower 3, and a linkage mechanism 20 couples the carrier element 19 to the mounting element 17 in order to facilitate the movement of the carrier element 19, and in turn the mower 3 in a general upwardly and downwardly direction relative to the mounting element 17.

The linkage mechanism 20 comprises an upper link member 22 and a lower link member 23 spaced apart downwardly below the upper link member 22. Each upper and lower link member 22 and 23 comprises a U-shaped member. The upper link member 22 comprises a pair of side limbs 16 extending rearwardly from a forward arcuate portion 18. The lower link member 23 comprises a pair of side limbs 21 extending rearwardly from a forward arcuate portion 24. The upper link member 22 is pivotally coupled to the mounting element 17 by a pair of first upper pivot shafts 25 carried on the mounting element 17 which pivotally engage corresponding free ends 26 of the upper link member 22. The first upper pivot shafts 25 define a common first upper pivot axis 27 about which the upper link member 22 is pivotally coupled to the mounting element 17. The lower link member 23 is pivotally coupled to the mounting element 17 by a pair of first lower pivot shafts 28 carried on the mounting element 17, which pivotally engage corresponding free ends 29 of the lower link member 23. The first lower pivot shafts 28 define a common first lower pivot axis 30 about which the lower link member 23 is pivotal relative to the mounting element 7.

A second upper pivot shaft 35 extending through the carrier element 19 pivotally engages a pair of spaced apart mounting brackets 36 mounted on and extending from the arcuate portion 18 of the upper link member 22 for pivotally coupling the upper link member 22 to the carrier element 19. The second upper pivot shaft 35 defines a second upper pivot axis 37 about which the upper link member 22 is pivotal relative to the carrier element 19. A pair of second lower pivot shafts 39 extending sidewardly on opposite sides of the carrier element 19 pivotally engages corresponding mounting brackets 40 extending downwardly from each side limb 21 of the lower link member 23 adjacent the arcuate portion 24 thereof for pivotally coupling the lower link member 23 to the carrier element 19. The second lower pivot shafts 39 define a common second lower pivot axis 42 about which the lower link member 23 is pivotal relative to the carrier element 19.

The first upper and lower pivot axes 27 and 30 and the second upper and lower pivot axes 37 and 42 extend substantially horizontally and substantially parallel to each other, and substantially transversely of the direction of normal forward motion of the mower 3. Accordingly, the upper and lower link members 22 and 23 of the linkage mechanism 20 permit movement of the carrier element 19 and the mower 3 in a generally upward and downward direction relative to the mounting element 17, and in turn the tractor, as the skid plate 9 rides along the ground 43, see FIGS. 2 to 4. As the carrier element 19, and in turn the mower 3 move downwardly relative to the mounting element 17, the upper and lower link members 22 and 23 pivot in the direction of the arrows A about the first upper and lower pivot axes 27 and 30 relative to the mounting element 17, and the upper and lower link members 22 and 23 pivot in the direction of the arrows B about the second upper and lower pivot axes 37 and 42 relative to the carrier element 19, see FIGS. 2 and 9. Conversely as the carrier element 19 and in turn the mower 3 move upwardly relative to the mounting element 17, the upper and lower link members 22 and 23 pivot in the directions of the arrows C about the first upper and lower pivot axes 27 and 30 relative to the mounting element 17, and in the direction of the arrows D about the second upper and lower pivot axes 37 and 42 relative to the carrier element 19, see also FIGS. 2 and 9.

A take-up element, which in this embodiment of the invention comprises a pair of elongated take-up tension springs 45 extending between respective first ends 46 and second ends 47 take up some of the weight of the carrier element 19 and the mower 3 in order to reduce the effective weight with which the skid plate 9 of the mower 3 bears on the ground of the field in which the crop is being mowed by the mower 3. The first ends 46 of the respective take-up springs 45 are coupled to first anchorages 38, which are in turn pivotally coupled to the mounting element 17 as will be described in detail below. The second ends 47 of the respective take-up springs 45 are coupled to second anchorages 41 which in turn are mounted on the respective side limbs 21 of the lower link member 23 adjacent the arcuate portion 24 thereof. The second anchorages 41 comprise respective anchor brackets 49 which are rigidly mounted on the side limbs 21 thereof. Connecting members 48 extend from the second ends 47 of the take-up springs 45, and connecting pins 44 pivotally connect the connecting members 48 to the corresponding anchor brackets 49. The connecting pins 44 define a common pivot axis 59 about which the second ends 47 of the take-up springs 45 are connected to the anchor brackets 49.

The first anchorages 38 are carried on respective compensating means, namely, compensating elements 50, which are pivotally coupled to the mounting element 17 about a common compensating pivot axis 54, so that the first ends 46 of the take-up springs 45 are coupled to the mounting element 17 through the corresponding compensating elements 50. In this embodiment of the invention the compensating elements 50, as will be described below, are configured for maintaining the length of the take-up springs 45 between the first and second ends 46 and 47 thereof substantially constant as the mower 3, and in turn the carrier element 19 moves upwardly and downwardly relative to the mounting element 17 within the normal working range of upward and downward movement of the mower 3 as the mower 3 rides along the ground. By maintaining the length of the take-up springs 45 substantially constant as the mower 3 moves upwardly and downwardly relative to the mounting element 17 within the normal working range of the upward and downward movement of the carrier element 19 relative to the mounting element 17, the tension in the take-up springs 45 remains substantially constant, and therefore, the portion of the weight of the carrier element 19 and the mower 3 taken up by the take-up springs 45 is maintained substantially constant within the normal working range of the upward and downward movement of the mower 3 relative to the mounting element 17, and in turn the effective weight with which the skid plate 9 of the mower 3 bears on the ground 43 is maintained substantially constant within the normal working range of the upward and downward movement of the mower 3 relative to the mounting element 17 as the skid plate 9 rides along the ground and follows the contours of the ground 43.

In this embodiment of the invention the normal working range of the upward and downward movement of the carrier element 19 and in turn the mower 3 is defined as the distance between a maximum upper position of the carrier element 19 and the mower 3 and a maximum lower position of the carrier element 19 and the mower 3 as the skid plate 9 of the mower 3 rises above a common datum plane 31, and falls below the common datum plane 31. The common datum plane 31 is defined as a planar surface on which the wheels 13 of the tractor to which the coupling apparatus 1 is coupled stand, and on which the skid plate 9 of the mower 3 bears, see FIGS. 2 to 4. In FIG. 2 the skid plate 9 of the mower 3 is illustrated bearing on the common datum plane 31. In FIG. 3 the skid plate 9 of the mower 3 is illustrated in a position corresponding to the maximum lower position of the carrier element 19 and the mower 3, which in this embodiment of the invention is equivalent to a distance of approximately 250 mm below the common datum plane 31. In FIG. 4 the skid plate 9 of the mower 3 is illustrated in a position corresponding to the maximum upper position of the carrier element 19 and the mower 3. In this embodiment of the invention the maximum upper position of the carrier element 19 and the mower 3 is equivalent to a distance of approximately 250 mm above the common datum plane 31.

Each compensating element 50 comprises a pair of spaced apart compensating arms 51 which are pivotally carried on the mounting element 17 about a corresponding compensating pivot shaft 53 extending between a pair of mounting brackets 52, which extend from the mounting element 17. The compensating pivot shafts 53 of the respective pairs of compensating arms 51 of the compensating elements 50 define the common compensating pivot axis 54.

Each first anchorage 38 comprises an anchor element 60 which is pivotally carried between the corresponding pair of the compensating arms 51 about a pivot axis 67, which is spaced apart along the corresponding pair of compensating arms 51 from the compensating pivot axis 54. The pivot axis 67 of each anchor element 60 is defined by a pivot shaft 56 which is pivotally carried by the compensating arms 51. Each anchor element 60 is formed by a concentric central portion 61 of the pivot shaft 56 of enlarged diameter, which is located between the corresponding pair of the compensating arms 51. An anchor bore 65 extends through the central portion 61 of each anchor element 60, and engages a threaded rod 62 extending from the first end 46 of the corresponding take-up spring 45. Nuts 63 and 64 on each threaded rod 62 on opposite sides of the corresponding anchor element 60 secure the threaded rod 62 to the anchor element 60. The threaded rods 62 extend from and are secured to discs 68 secured in the first ends 46 of the respective take-up springs 45. The anchor bore 65 of each anchor element 60 defines a central axis 66 which extends perpendicularly to the pivot axis 67 defined by the corresponding pivot shaft 56 and cuts the pivot axis 67, so that the pivot shaft 56 can pivot freely about the pivot axis 67 with the corresponding threaded rod 62 engaged and secured in the anchor element 60 as the corresponding compensating arms 51 pivot about the common compensating pivot axis 54.

An actuator element, in this case an actuator arm 55 is also pivotally coupled to the corresponding pair of compensating arms 51 by the pivot shaft 56, and to an adjacent corresponding side limb 16 of the upper link member 22 by a pivot shaft 57. Each pivot shaft 57 is carried in a mounting bracket 58 welded to the corresponding side limb 16 of the upper link member 22. The actuator arms 55 are responsive to pivotal movement of the upper link member 22 about the first upper pivot axis 27, which in turn is responsive to upward and downward movement of the carrier element 19 relative to the mounting element 17, for pivoting the compensating arms 51, and in turn the anchor elements 60 about the common compensating pivot axis 54 for maintaining the length of the take-up springs 45 between the first and second ends 46 and 47 thereof substantially constant, and in turn for maintaining the effective weight of the mower bearing on the ground substantially constant as the mower 3, and in turn the carrier element 19 moves upwardly and downwardly relative to the mounting element 17 within the normal working range of the upward and downward movement. As the carrier element 19 and in turn the mower 3 move downwardly from the maximum upper position (FIG. 4) to the maximum lower position (FIG. 3) the actuator arms 55 urge the compensating arms 51, and in turn the anchor elements 60, downwardly about the compensating pivot axis 54 from a predefined upper state illustrated in FIG. 4 to a predefined lower state illustrated in FIG. 3, so that as the lower link member 23 pivots downwardly, the downward movement of the anchor brackets 49 is compensated for by the downward movement of the anchor elements 60, to thereby maintain the lengths of the take-up springs 45 substantially constant, and vice versa as the carrier element 19 is moving upwardly.

By maintaining the length of the take-up springs 45 between their first and second ends 46 and 47 substantially constant, the tension in the take-up springs 45 is similarly maintained substantially constant, and therefore the weight of the carrier element 19 and the mower 3 taken up by the take-up springs 45 is maintained substantially constant. Accordingly, the effective weight of the mower 3 and the carrier element 19 bearing on the ground 43 is maintained substantially constant as the skid plate 9 of the mower 3 rides upwardly and downwardly along the ground relative to the mounting element 17 within the normal working range of the upward and downward movement of the mower 3.

The radius R of the arc through which the pivot axes 67 defined by the pivot shafts 56 traverse about the compensating pivot axis 54 of the compensating elements 50 is determined, so that as the carrier element 19 and the mower 3 move upwardly and downwardly relative to the mounting element 17 within the normal working range of the upward and downward movement of the carrier element 19 and in turn the mower 3, the lengths of the take-up springs 45 between the first and second ends 46 and 47 thereof is maintained substantially constant. In other words, as the upper and lower linkage members 22 and 23 pivot in the direction of the arrows A about the first upper and lower pivot axes 27 and 30, as the carrier element 19, and in turn the mower 3 move downwardly relative to the mounting element 17, the compensating arms 51 urge the corresponding anchor elements 60 downwardly about the common compensating axis 54 in the direction of the arrow E, thereby maintaining the length of each of the take-up springs 45 between the first and second ends 46 and 47 thereof substantially constant, so that the tension in the take-up springs 45 also remains substantially constant, and therefore, the portion of the weight of the carrier elements 19 and the mower 3 taken up by the take-up spring 45 remains substantially constant within the normal working range of the upward and downward movement of the mower 3, and therefore the effective weight with which the skid plate 9 of the mower 3 bears on the ground as the skid plate 9 rides upwardly and downwardly along the ground remains substantially constant within the normal working range of the upward and downward movement of the mower 3.

In this embodiment of the invention, when the tractor and the mower 3 are moving along ground which defines the common datum plane 31 as defined above, the normal working maximum downward movement of the skid plate 9 of the mower 3 from the common datum plane 31 relative to the mounting element 17, as discussed above, is approximately 250 mm below the common datum plane 31 in the event of the ground engaged by the skid plate 9 of the mower 3 falling away from the common datum plane 31 along which the tractor is travelling. The normal working maximum upward movement of the skid plate 9 of the mower 3 from the common datum plane 31 relative to the mounting element 17, as discussed above, is approximately 250 mm above the common datum plane in the event of the ground engaged by the skid plate 9 of the mower 3 rising upwardly from the common datum plane 3 along which the tractor is travelling. In this embodiment of the invention, the tension in the take-up springs 45 is set, so that the effective weight, with which the skid plate 9 of the mower 3 bears on the ground, is maintained substantially constant at approximately 300 kgs. Therefore, as the skid plate 9 of the mower 3 rides upwardly and downwardly along the ground relative to the mounting element 17 within the normal working range of + or −250 mm relative to the common datum plane 31 along which the tractor is travelling, the effective weight with which the mower 3 bears on the ground is maintained substantially constant at approximately 300 kgs.

Thus, when the mower 3 encounters falling ground, which is inclined downwardly relative to the ground on which the wheels of the tractor are travelling, the mower 3 and the carrier element 19 move downwardly relative to the mounting element 17 as the skid plate 9 follows the falling ground. The skid plate 9 of the mower 3, as it continues to follow the falling ground, will continue to fall further below the common datum plane 31 until the angle of the falling ground commences to increase relative to the plane of the ground on which the tractor is travelling. At which stage, the skid plate 9 will commence to rise towards the common datum plane 31, and will continue to rise to the common datum plane 31 until the ground on which the wheels of the tractor are travelling, and the ground on which the skid plate is bearing lie again in the common datum plane. Conversely, when the mower 3 encounters rising ground which is inclined upwardly relative to the ground on which the wheels of the tractor are travelling, the mower 3 and the carrier element 19 move upwardly relative to the mounting element 17 as the skid plate 9 follow the rising ground. The skid plate 9 of the mower 3 as it continues to follow the rising ground, will continue to rise further above the common datum plane 31 until the angle of the rising ground commences to decrease relative to the plane of the ground on which the wheels of the tractor are travelling. At which stage, the skid plate 9 will commence to fall towards the common datum plane 31, and will continue to fall to the common datum plane 31 until the ground on which the wheels of the tractor are travelling and the ground on which the skid plate 9 is bearing lie again in the common datum plane 31.

An adjusting means for adjusting the tension in the take-up springs 45 for accommodating different weights of mowers 3 comprises the threaded rods 62 which are secured to and extend from the first ends 46 of the take-up springs 45. The threaded rods 62, as discussed above, engage the bores 65 in the corresponding anchor elements 60, and thus by adjusting the threaded rods 62 in the bores 65 of the anchor elements 60 for varying the effective length of the threaded rods 62 between the first ends 46 of the take-up springs 45 and the anchor elements 60, the tension in the take-up springs 45 can be adjusted. Shortening the effective length of the threaded rods 62 between the first ends 46 of the take-up springs 45 and the corresponding anchor elements 60 increases the tension in the take-up springs 5, while increasing the effective length of the threaded rods 62 between the first ends 46 of the take-up springs 45 and the corresponding anchor elements 60 reduces the tension in the take-up springs 45. The nuts 63 and 64 retain the threaded rods 62 with the effective length of the threaded rods 62 between the first end 46 of the take-up springs 45 and the anchor elements 60 at the desired effective length.

A lifting ram 69 is coupled between the mounting element 17 and the carrier element 19 for raising the carrier element 19 and in turn the mower 3 into a transport state which is illustrated in FIG. 5. In this embodiment of the invention the lifting ram 69 raises the carrier element 19 and the mower 3 a further 250 mm above the maximum upper position of the carrier element 19 and the mower 3. In other words, when the wheels of the tractor are standing on ground which is in the same plane as the plane on which the skid plate 9 of the mower 3 is bearing, namely, when the wheels of the tractor and the skid plate 9 of the mower 3 are standing and bearing on the common datum plane 31, when the carrier element 19 and the mower 3 are in the transport state, the skid plate 9 of the mower 3 is approximately 500 mm above the common datum plane 31. This is sufficient for allowing the mower 3 to clear crop material which has already been mowed. When the lifting ram 69 is operated to lower the carrier element 19 and the mower 3 downwardly into the working state, the lifting ram 69 is operated in a floating state, so that the coupling apparatus 1, the carrier element 19 and the mower 3 also float, and the lifting ram 69 does not in any way impede the upward and downward movement of the carrier element 19 and the mower 3 relative to the mounting element between the maximum upper position and the maximum lower position of the carrier element 19 and the mower 3 as the carrier element 19 and the mower 3 move relative to the mounting element within the normal working range of the upward and downward movement of the carrier element and the mower 3 relative to the mounting element 17. The length of the stroke of the lifting ram 69 is such as to allow the carrier element 19 and the mower 3 to move downwardly relative to the mounting element 17 to the maximum lower position of the normal working range of the carrier element 19 and the mower 3 relative to the mounting element 17.

In use, with the mower 3 coupled to the carrier element 19 and the mounting element 17 coupled to the front three-point linkage 5 of the tractor (not shown), and the mower 3 connected to the power take-off shaft (not shown) of the tractor, and the lifting ram 69 connected to the hydraulic system of the tractor, the coupling apparatus 1 is ready for use. With the tractor and the mower 3 standing on horizontal ground, and with the skid plate 9 of the mower 3 bearing on the horizontal ground, the angle of attack a of the skid plate is set to the desired negative angle of attack, typically, −6° with the skid plate angled generally downwardly from the trailing edge 11 to the leading edge 10 thereof. Provision for adjustment of the angle of attack a of the skid plate 9 may be provided for in the carrier element 19 and/or in the mower 3. Mowing of the crop to be mowed commences with the tractor urging the mower 3 forwardly in the direction of the arrow X and with the skid plate 9 riding along the ground. Should the mower encounter falling, downwardly inclined ground relative to the ground on which the wheels of the tractor are moving, the mower 3 moves downwardly relative to the mounting element 17 as the skid plate 9 follows the contour of the ground downwardly.

This downward movement of the mower 3 relative to the mounting element 17 results in the upper and lower link members 22 and 23 pivoting downwardly in the direction of the arrow A about the first upper and lower pivot axes 27 and 30, respectively. This in turn results in the actuator arms 55 urging the compensating arms 51 to pivot downwardly about the common compensating pivot axis 54 in the direction of the arrow E, see FIGS. 2 and 9, to in turn urge the anchor elements 60 downwardly in order to maintain the length of the take-up springs 45 between the first and second ends 46 and 47 substantially constant, and in turn to maintain the tension in the take-up springs 45 substantially constant during the downward movement of the mower 3 relative to the mounting element 17. This, thus, maintains the effective weight with which the skid plate 9 bears on the ground substantially constant within the normal working range of the downward movement of the carrier element 19 relative to the mounting element 17.

As the ground engaging portion of the ground engaging wheels of the tractor and the skid plate 9 again begin to come into alignment, the mower 3 rises relative to the mounting element 17, which reverses the movement of the upper and lower link members 22 and 23, such that the upper and lower link members 22 and 23 commence to pivot upwardly about the first upper and lower pivot axes 27 and 30 in the direction of the arrow C, see FIGS. 2 and 9. This upward pivoting of the upper and lower link members 22 and 23 in the direction of the arrow C results in the actuator arms 55 urging the compensating arms 51 to pivot upwardly in the direction of the arrow G about the compensating pivot axis 54, see FIGS. 2 and 9, which in turn urges the anchor elements 60 upwardly, thereby maintaining the length of the take-up springs 45 substantially constant, and in turn the tension in the take-up springs 45 substantially constant during rising of the mower 3 relative to the mounting element 17 within the normal working range of the upward movement of the carrier element 19 relative to the mounting element 17.

Additionally, on the mower 3 encountering rising, upwardly inclined ground relative to the ground on which the ground engaging wheels of the tractor are moving, the mower 3 is urged upwardly relative to the mounting element 17, which in turn results in the upper and lower link members 22 and 23 pivoting upwardly in the direction of the arrow C about the first upper and lower pivot axes 27 and 30, see FIGS. 2 and 9. This upward pivoting of the upper and lower link arms 22 and 23 in the direction of the arrows C about the first upper and lower pivot axes 27 and 30 results in the actuator arms 55 urging the compensating arms 51 to pivot upwardly about the common compensating pivot axis 54 in the direction of the arrow G, see FIGS. 2 and 9, which in turn urges the anchor elements 60 upwardly, thus maintaining the length of and the tension in the take-up springs 45 substantially constant as the mower 3 is urged upwardly relative to the mounting element 17 within the normal working range of the upward movement of the carrier element 19 relative to the mounting element 17.

As the ground engaging portion of the ground engaging wheels of the tractor and the skid plate 9 of the mower 3 again begin to come into alignment, the mower 3 falls relative to the mounting element 17, which reverses the movement of the upper and lower link members 22 and 23, such that the upper and lower link members commence to pivot downwardly about the first upper and lower pivot axes 27 and 30 in the direction of the arrow A, see FIGS. 2 and 9. This downward pivoting of the upper and lower link members 22 and 23 in the direction of the arrow A results in the actuator arms 55 urging the compensating arms 15 to pivot downwardly in the direction of the arrow E about the compensating pivot axis 54, see FIGS. 2 and 9, which in turn urges the anchor element downwardly, thereby maintaining the length of the take-up springs 45 substantially constant, and in turn maintaining the tension in the tension springs 45 substantially constant during the falling of the mower 3 relative to the mounting element 17 within the normal working range of the upward and downward movement of the carrier element 19 relative to the mounting element 17.

Referring now to FIGS. 14 to 31, there is illustrated coupling apparatus according to another embodiment of the invention and indicated generally by the reference numeral 80 for coupling an agricultural implement to a three-point linkage 5 of a tractor (not shown), and in particular, for coupling a mower 3, substantially similar to the mower 3 described with reference to the coupling apparatus of FIGS. 1 to 13, to a front three-point linkage of a tractor or other prime mover. The coupling apparatus 80 is substantially similar to the coupling apparatus 1, and similar components are identified by the same reference numerals.

Two aspects of the coupling apparatus 80 are different to the corresponding aspects of the coupling apparatus 1.

Firstly, the upper link member 22 of the linkage mechanism 20, instead of being provided by a U-shaped member is provided by a pair of separate spaced apart upper link members 81. Secondly, the construction and operation of the compensating means for maintaining the amount of the weight of the mower 3 taken up by the take-up springs 45 substantially constant, as the mower 3, and in turn the carrier element 19 move upwardly and downwardly relative to the mounting element 17 within the normal working range of the upward and downward movement of the mower 3, is different to construction and operation of the compensating means and its operation in the coupling apparatus 1.

Turning initially to the upper link members 81, the upper link members 81 are pivotally coupled to the mounting element 17 by respective first upper pivot shafts 82, each of which are carried on a corresponding pair of mounting brackets 83 which extend forwardly from the mounting element 17. The upper link members 81 are pivotally coupled to the carrier element 19 by a pair of second upper pivot shafts 85 which extend sidewardly from the carrier element 19 on respective opposite sides thereof. The first upper pivot shafts 82 define a common first upper pivot axis 86 which extends substantially transversely of the direction of normal forward motion of the mower 3. The second upper pivot shafts 85 define a common second upper pivot axis 87 which extends substantially parallel to the second upper pivot axis 85 and in turn substantially transversely of the direction of normal forward motion of the mower 3. As in the coupling apparatus 1, the first and second upper pivot axes 86 and 87 are parallel to the first and second lower pivot axes 30 and 42. However, in this embodiment of the invention the first upper pivot axis 86 defined by the first upper pivot shafts 82 is located at a level spaced apart above the level of the first lower pivot axis 30 which is greater than the level at which the first upper pivot axis 27 is spaced apart above the level of the first lower pivot axis 30 of the coupling apparatus 1. Additionally, the first upper pivot axis 86 defined by the first upper pivot shafts 82 is located more forwardly of the first lower pivot axis 30 in this embodiment of the invention than in the coupling apparatus 1. Otherwise, the mounting of the carrier element 19 to the mounting element 17 by the linkage mechanism 20 of the coupling apparatus 80 is similar to that of the linkage mechanism 20 of the coupling apparatus 1.

Turning now to the coupling of the take-up springs 45 to the mounting element 17 through the compensating means, in this embodiment of the invention the first ends 46 of the take-up springs 45 are connected to first anchorages 91 by the respective threaded rods 62. The first anchorages 91 are carried on respective compensating means, provided by compensating elements 84, which are somewhat similar to the compensating elements 50 of the coupling apparatus 1 and will be described below. The second ends 47 of the take-up springs 45 are coupled to the lower link member 23 by second anchorages 41, namely, second anchor brackets 49. Connecting members 48 extending from the second ends 47 of the respective take-up springs 45 pivotally engage connecting pins 44 carried by the anchor brackets 49 for connecting the take-up springs 45 to the anchor brackets 49.

Each compensating element 84 comprises a pair of compensating arms 88 which are substantially similar to the compensating arms 51 of the coupling apparatus 1. The pairs of compensating arms 88 are pivotally carried on compensating pivot shafts 53, similar to the compensating pivot shafts 53 of the coupling apparatus 1. The compensating pivot shafts 53 are pivotally carried in mounting brackets 52 which extend from the mounting element 17. The compensating pivot shafts 53 of the respective pairs of compensating arms 88 define a common compensating pivot axis 54 which extends transversely of the direction of normal forward motion of the mower 3, and parallel to the first and second upper and lower pivot axes 27, 30, 37 and 42.

The first anchorages 91 by which the respective first ends 46 of the take-up springs 45 are anchored to the corresponding pairs of compensating arms 88 are substantially similar to the first anchorages 38 of the coupling apparatus 1, and each first anchorage 91 comprises an anchor element 60 formed by a concentric central portion 61 of enlarged diameter of a pivot shaft 56, which is pivotally carried in the corresponding pair of compensating arms 88 between the pair of compensating arms 88. A bore 65 extending through the anchor element 60 accommodates the threaded shaft 62 extending from the first end 46 of the corresponding take-up spring 45 as already described with reference to the coupling apparatus 1. Nuts 63 and 64 secure each threaded rod 62 in the bore 65 of the corresponding anchor element 60 as already described with reference to the coupling apparatus 1. Additionally, the nuts 63 and 64 of each threaded rod 62 facilitate manual adjustment of the tension in the corresponding take-up springs 45, as also described with reference to the coupling apparatus 1.

However, in this embodiment of the invention the compensating pivot shafts 53 are located at a lower level relative to the level of the first upper pivot axis 86 defined by the first upper pivot shafts 82 than the level of the compensating pivot shafts 53 relative to the level of the first upper pivot axis 27 of the coupling apparatus 1.

Additionally, in this embodiment of the invention each actuator element, namely, each actuator arm 89, acts between the corresponding pair of compensating arms 88 and the corresponding side limb 21 of the lower link member 23, rather than in the case of the coupling apparatus 1 where the actuator arms 55 act between the corresponding pairs of compensating arms 51 and the corresponding side limbs 16 of the upper link member 22. A mounting bracket 90 secured to each side limb 21 carries a pivot shaft 92 which pivotally connects the corresponding actuator arm 89 to the mounting bracket 90. Each actuator arm 89 at its upper end 93 is pivotally coupled to the corresponding pivot shaft 56, the central portion 61 of which forms the corresponding anchor element 60. The pivot shafts 92 define a common pivot axis which extends parallel to the first and second upper and lower pivot axes 27, 30, 37 and 42.

Accordingly, in this embodiment of the invention as the mower 3, and in turn the carrier element 19 moves upwardly and downwardly relative to the mounting element 17, the lower link member 23 of the linkage mechanism 20 pivots upwardly and downwardly, respectively, about the first lower pivot axis 30 in the directions of the arrows A and C, and the actuator arms 89 pivot the compensating arms 88 upwardly and downwardly, respectively, about the compensating pivot axis 54. Thus, the compensating arms 88 are responsive to upward and downward movement of the carrier element 19 relative to the mounting element 17 for urging the anchor elements 60 upwardly and downwardly, respectively, about the compensating pivot axis 54 relative to the mounting element 17, and in turn upwardly and downwardly, respectively, relative to the first lower pivot axis 30 of the lower link member 23.

This upward and downward movement of the anchor elements 60 in response to the upward and downward movement, respectively, of the carrier element 19 and the mower 3 controls the value of the turning moment induced by the take-up springs 45 in the linkage mechanism 20 about a fulcrum, about which the linkage mechanism 20 pivots, so that the turning moment induced in the linkage mechanism 20 by the take-up springs 45 acts against the turning moment induced in the linkage mechanism 20 about the same fulcrum by the weight of the carrier element 19 and the mower 3, to maintain the weight of the carrier element 19 and the mower 3 taken up by the take-up springs 45 substantially constant, to in turn maintain the effective weight with which the skid plate 9 of the mower 3 bears on the ground also substantially constant, within the normal working range of the upward and downward movement of the carrier element 19 and the mower 3.

The first lower pivot axis 30 essentially forms a fulcrum about which the lower link member 23 of the linkage mechanism 20 is pivotal, and about which the carrier element 19 and the mower 3 are also pivotal as the linkage mechanism 20 constrains the carrier element 19 and the mower 3 to move in the generally upwardly and downwardly direction. Therefore, the first lower pivot axis 30 is essentially the fulcrum about which the turning moment induced in the lower link member 23 by the weight of the coupling element 19 and the mower 3 acts downwardly. The tension forces in the take-up springs 45 acting through the anchor brackets 49 and the anchor elements 60 induce a turning moment in the lower link member 23 which acts upwardly about the first lower pivot axis 30, to take up the appropriate portion of the weight of the carrier element 19 of the mower 3 to be taken up. The tension forces in the take-up springs 45 which form this turning moment act along respective parallel lines of action 94 through connecting points 95 and 96 at which the take-up springs 45 are connected to the anchor brackets 49 and the anchor elements 60, respectively, see FIGS. 29 to 31. The pivot points 95 coincide with the pivot axis 59 defined by the connecting pins 44 which connect the second ends 47 of the take-up springs 45 to the anchor brackets 49, while the pivot points 96 coincide with the pivot axes 67 defined by the pivot shafts 56 of the anchor elements 60. The lever arm of the tension forces in the take-up springs 45 acting along the lines 94 of action forming the turning moment about the first lower pivot axis 30 is the perpendicular distance from the lines 94 of action of the tension forces to the first lower pivot axis 30, see FIGS. 29 to 31.

Accordingly, the turning moment induced in the lower link member 23 by the tension forces $f_1$ and $f_2$ in the take-up springs 45a and 45b, respectively, about the first lower pivot axis 30 is equal to $$(f_1+f_2) \times l.$$

In this embodiment of the invention as the carrier element 19 and the mower 3 move downwardly relative to the mounting element 17 from the maximum upper position to the maximum lower position, the take-up springs 45 extend slightly, which thus slightly increases the tension forces $f_1$ and $f_2$ in the respective take-up springs 45a and 45b, which act along the lines 94 of action. In order to compensate for this slight increase in the values of the forces $f_1$ and $f_2$, as the carrier element 19 and the mower 3 are moving downwardly relative to the mounting element 17, the actuator arms 89 pivot the compensating arms 88 downwardly about the compensating pivot axis 54, thus urging the anchor elements 60 downwardly from a predefined upper state to a predefined lower state, in a direction towards the first lower pivot axis 30, and thereby the lever arm of the turning moment, namely, the distance l is reduced as the carrier element 19 and the mower 3 move downwardly relative to the mounting element 17. This reduction in the lever arm, namely, the distance l, compensates for the slight increases in the tension forces $f_1$ and $f_2$ in the take-up springs 45, and in turn controls the turning moment induced in the lower link member 23 about the first lower pivot axis 30, so that as the carrier element 19 and the mower 3 move downwardly from the maximum upper position to the maximum lower position within the normal working range of the upward and downward movement of the mower 3 relative to the mounting element 17, the weight of the carrier element 19 and the mower 3 taken up by the take-up springs 45 remains substantially constant, and in turn the effective weight with which the skid plate 9 bears on the ground remains substantially constant.

In this embodiment of the invention it is believed that the configuration of the compensating elements 84 and the actuator arms 89 maintain the turning moment induced in the linkage mechanism 20 by the take-up springs 45 substantially constant as the carrier element 19 and the mower 3 are moving upwardly and downwardly between the maximum upper position and the maximum lower position of the normal working range of the upward and downward movement of the carrier element 19 and the mower 3 relative to the mounting element 17.

The coupling apparatus 80 is illustrated with the carrier element 19 and the mower 3 in the maximum upper position in FIGS. 21 and 31, and in the maximum lower position in FIGS. 20 and 30.

In this embodiment of the invention, as mentioned above, the normal range of upward and downward movement of the mower 3 and in turn the carrier element 19 relative to the mounting element 17 is approximately plus or minus 250 mm, which corresponds to movement of the skid plate 9 of the mower 3 of 250 mm above the common datum plane 31 and 250 mm below the common datum plane 31. Accordingly, when the tractor is standing on level ground defining the common datum plane 31, the normal working range of upward and downward movement of the skid plate 9 of the mower 3 relative to the mounting element 17 is between −250 mm and +205 mm about the common datum plane 31. Therefore, the maximum upper position of the skid plate 9 of the mower 3 above the common datum plane 31 is 250 mm and the maximum lower position of the skid plate 9 of the mower 3 below the common datum plane 31 is 250 mm, within the normal working range of the upward and downward movement of the mower 3, and in turn the carrier element 19 relative to the mounting element 17.

An hydraulic lifting ram 98 coupled between the mounting element 17 and the carrier element 19 is provided for raising the carrier element 19 and in turn the mower 3 into a transport state above the normal working range of the upward and downward movement of the mower 3, similar to the lifting ram 69 of the coupling apparatus 1. The coupling apparatus 80 is illustrated with the carrier element 19 and the mower 3 in the transport state in FIG. 22. In this embodiment of the invention when the carrier element 19 and the mower 3 are raised by the lifting ram 98 into the transport state, the skid plate 9 of the mower 3 is raised approximately 250 mm above the common datum plane 31.

The lifting ram 98 is pivotally coupled by pivot mounting brackets 99 to the mounting element 17. A connecting plate 100 extending from a piston rod 101 of the lifting ram 98 slideably engages a connecting pin 103, which is carried between a pair of spaced apart mounting plates 104 mounted on the carrier element 19, see FIG. 18. The connecting pin 103 is slideable in an elongated slot 105 extending longitudinally in the connecting plate 100, so that when the carrier element 19 and in turn the mower 3 are lowered from the transport state to a working state, the carrier element 19, and in turn the mower 3 can move upwardly and downwardly relative to the mounting element 17 unimpeded by the lifting ram 98 due to the fact that the upward and downward movement of the carrier element 19 within the normal working range thereof is accommodated by the sliding movement of the connecting pin 103 in the slot 105 in the connecting plate 100. Additionally, when the lifting ram 98 is operable to lower the coupling apparatus 80, the carrier element 19 and the mower 3, the lifting ram 98 is operated into a floating state, in order to further ensure that the coupling apparatus 80, the carrier element 19 and the mower 3 can freely move upwardly and downwardly unimpeded by the lifting ram 98.

In use, with the mower 3 coupled to the forward three-point linkage of a tractor by the coupling apparatus 80, the mower 3 is ready for use. As the tractor and mower 3 traverse across uneven ground and as the skid plate 9 of the mower 3 follows the contour of the ground, the mower 3 and in turn the carrier element 19 rise and fall relative to the mounting element 17. As the mower 3 falls downwardly relative to the mounting element 17, the lower link member 23 pivots downwardly about the first lower pivot axis 30. This downward movement of the mower 3 results in a slight increase in the respective lengths of the take-up springs 45, thus slightly increasing the tension forces $f_1$ and $f_2$ in the take-up springs 45 acting between the respective anchor brackets 49 and the anchor elements 60. As the lower link member 23 pivots downwardly about the first lower pivot axis 30, the actuator arms 89 are urged downwardly, thus pivoting the compensating arms 88 downwardly, which in turn urge the anchor elements 60 downwardly towards the first lower pivot axis 30, thereby reducing the length l of the lever arm of the turning moment induced in the lower link member 23 about the first lower pivot axis 30 by the tension forces $f_1$ and $f_2$ of the take-up springs 45. By reducing the length l of the lever arm as the length of the take-up springs 45 increase, the increase in the tension forces $f_1$ and $f_2$ in the take-up springs 45 is compensated for, and thereby the turning moment induced in the linkage mechanism 20 by the take-up springs 45 is controlled, so that the effective weight with which the mower 3 bears on the ground through the skid plate 9 is maintained substantially constant by the coupling apparatus 80.

Conversely, as the mower 3 and in turn the carrier element 19 rise relative to the mounting element 17, the upward pivoting of the lower link member 23 about the first lower pivot axis 30 causes the actuator arms 89 to urge the compensating arms 88 to pivot upwardly about the compensating pivot axis 54, thereby urging the anchor elements 60 upwardly from the first lower pivot axis 30, so that the lever arm l of the turning moment increases as the value of the tension forces $f_1$ and $f_2$ in the take-up springs 45 decreases. Thereby the turning moment induced by the take-up springs 45 in the linkage mechanism 20 is controlled, so that the effective weight with which the mower 3 bears on the ground through the skid plate 9 is maintained substantially constant by the coupling apparatus 80.

It will be appreciated that while the take-up element of each of the coupling apparatus described has been described as comprising a pair of tension springs, a single tension spring in certain cases may be sufficient. It will also be appreciated that other suitable take-up elements may be provided, for example, one or more compression springs, an hydraulic spring, a pneumatic spring, or indeed, any other suitable resilient member suitable for taking up a portion of the weight of the carrier element and the agricultural implement attached to the carrier element.

It will also be appreciated that while the coupling apparatus has been described for coupling a mower to a three-point linkage of a tractor, the coupling apparatus may be adapted for coupling any agricultural element to a three-point linkage, or indeed to any other suitable mounting system of a tractor or a prime mover. It will also be appreciated that the coupling apparatus according to the invention may be configured for coupling to a rearwardly located three-point linkage of a tractor or other prime mover.

While particular compensating means have been described, any other suitable compensating means may be provided. It is envisaged that instead of pivotally coupling the compensating means to the mounting element, the compensating means may be slideably coupled to the mounting element for urging the first anchorage relative to the mounting element.

While a particular linkage mechanism has been described for coupling the carrier element to the mounting element, any other suitable linkage mechanism may be provided.

While it is desirable, it is not essential that the first lower pivot axis of the lower link member should be offset from the vertical plane containing the first upper pivot axis. It is envisaged in certain cases, the first upper and lower pivot axes may be contained in a common vertical plane.

While the maximum upper position and the maximum lower position of the mower 3 and the carrier element 18 have been described as corresponding to the skid plate of the mower being approximately 250 mm above the common datum plane, and being approximately 250 mm below the common datum plane, it will be readily apparent to those skilled in the art that the maximum upper position and the maximum lower position of the normal working range of the carrier element and the mower may be either greater or less than plus or minus 250 mm below the common datum plane. Similarly, it will be appreciated that the transport state of the carrier element and the mower may correspond to a greater distance than 500 mm of the skid plate of the mower above the common datum plane.

The invention claimed is:

1. Coupling apparatus for coupling an agricultural implement to a prime mover, the coupling apparatus comprising:
    a mounting element for coupling to the prime mover,
    a carrier element for carrying the agricultural implement,
    a linkage mechanism coupling the carrier element to the mounting element, the linkage mechanism being configured to permit movement of the carrier element in a generally upwardly and downwardly direction relative to the mounting element,
    a take-up element for taking up some of the weight of the agricultural implement, the take-up element being connected to the linkage mechanism, and
    a compensating means coupling the take-up element to the mounting element, the compensating means being responsive to relative movement between the carrier element and the mounting element for maintaining the weight of the agricultural implement taken up by the take-up element substantially constant as the carrier element and the agricultural implement move upwardly and downwardly relative to the mounting element within the normal working range of upward and downward movement of the agricultural implement.

2. Coupling apparatus as claimed in claim 1 in which the take-up element is coupled to a first anchorage located on the compensating means, and the compensating means is coupled to the mounting element and is configured for urging the first anchorage relative to the mounting element in response to the upward and downward movement of the carrier element.

3. Coupling apparatus as claimed in claim 2 in which the compensating means is configured so that the distance of travel of the first anchorage relative to the mounting element is substantially proportional to the distance of travel of the carrier element relative to the mounting element.

4. Coupling apparatus as claimed in claim 2 in which the compensating means is pivotally coupled to the mounting element about a compensating pivot axis extending generally transversely of the direction of normal forward motion of the coupling apparatus, and the first anchorage is carried on the compensating means at a location spaced apart from the compensating pivot axis.

5. Coupling apparatus as claimed in claim 2 in which an actuator element is coupled between the compensating means and the linkage mechanism for urging the compensating means relative to the mounting element in response to the upward and downward movement of the carrier element relative to the mounting element.

6. Coupling apparatus as claimed in claim 2 in which the take-up element is coupled to a second anchorage located on the linkage mechanism.

7. Coupling apparatus as claimed in claim 1 in which configured the linkage mechanism comprises an upper link member and a lower link member, the upper link member being pivotally coupled to the mounting element about a first upper pivot axis, and the lower link member being pivotally coupled to the mounting element about a first lower pivot axis, at a level spaced apart below the first upper pivot axis, the first upper and lower pivot axes extending substantially parallel to each other, and substantially transversely of the direction of normal forward motion of the coupling apparatus.

8. Coupling apparatus as claimed in claim 1 in which the compensating means comprises a compensating arm.

9. Coupling apparatus as claimed in claim 1 in which the take-up element comprises a spring.

10. Coupling apparatus as claimed in claim 1 in which the take-up element comprises a tension spring.

11. Coupling apparatus as claimed in claim 1 in which the mounting element is adapted for coupling to a three-point linkage adjacent the front of a tractor.

12. In combination a prime mover and a mower coupled to the prime mover by the coupling apparatus as claimed in claim 1.

13. Coupling apparatus as claimed in claim 2 in which the compensating means is configured to urge the first anchorage from a predefined upper state to a predefined lower state in response to the carrier element moving from a maximum upper position to the maximum lower position within the normal working range of the upward and downward movement of the carrier element relative to the mounting element.

14. Coupling apparatus as claimed in claim 7 in which the upper and lower link members of the linkage mechanism are coupled to the carrier element about respective second upper and lower pivot axes extending substantially transversely of the direction of normal forward motion of the coupling apparatus, the second lower pivot axis being located at a level spaced apart below the second upper pivot axis, the perpendicular spacing between the first and second upper pivot axes being less than the perpendicular spacing between the first and second lower pivot axes.

15. Coupling apparatus as claimed in claim 1 in which the coupling apparatus comprises a mower carried on the carrier element.

16. Coupling apparatus for coupling an agricultural implement to a prime mover, the coupling apparatus comprising:
a mounting element for coupling to the prime mover,
a carrier element for carrying the agricultural implement,
a linkage mechanism coupling the carrier element to the mounting element, the linkage mechanism being configured to permit movement of the carrier element in a generally upwardly and downwardly direction relative to the mounting element,
a take-up element for taking up some of the weight of the agricultural implement, the take-up element being connected to the linkage mechanism, and
a compensating means coupling the take-up element to the mounting element, the compensating means being responsive to relative movement between the carrier element and the mounting element for maintaining the weight of the agricultural implement taken up by the take-up element substantially constant as the carrier element and the agricultural implement move upwardly and downwardly relative to the mounting element within the normal working range of upward and downward movement of the agricultural implement, wherein
the compensating means comprises a first anchorage located thereon, and is configured for urging the first anchorage relative to the mounting element in response to the upward and downward movement of the carrier element, and
the take-up element is coupled to a first anchorage.

17. Coupling apparatus for coupling an agricultural implement to a prime mover, the coupling apparatus comprising:
a mounting element for coupling to the prime mover,
a carrier element for carrying the agricultural implement,
a linkage mechanism coupling the carrier element to the mounting element, the linkage mechanism being configured to permit movement of the carrier element in a generally upwardly and downwardly direction relative to the mounting element,
a take-up element for taking up some of the weight of the agricultural implement, and
a compensating means co-operating with the take-up element and being responsive to relative movement between the carrier element and the mounting element for maintaining the weight of the agricultural implement taken up by the take-up element substantially constant as the carrier element and the agricultural implement move upwardly and downwardly relative to the mounting element within the normal working range of upward and downward movement of the agricultural implement, wherein
the linkage mechanism defines a fulcrum about which the carrier element is pivotal relative to the mounting element for permitting the upward and downward movement of the carrier element relative to the mounting element,
the take-up element is coupled to a first anchorage located on the compensating means, and
the first anchorage is located on the compensating means so that the perpendicular distance to the fulcrum from the line of action of the force in the take-up element acting through the first anchorage is variable in response to the upward and downward movement of the carrier element relative to the mounting element.

18. Coupling apparatus as claimed in claim 17 in which the compensating means is configured to control the value of the turning moment induced by the take-up element about the fulcrum in response to the upward and downward movement of the carrier element relative to the mounting element within the normal working range of the upward and downward movement of the carrier element relative to the mounting element for maintaining the weight of the agricultural implement taken up by the take-up means substantially constant.

19. Coupling apparatus as claimed in claim 17 in which the compensating means is configured to maintain the value of the turning moment induced by the take-up element about the fulcrum substantially constant as the carrier element moves upwardly and downwardly relative to the mounting element within the normal working range of the upward and downward movement of the carrier element relative to the mounting element.

* * * * *